US012623670B2

(12) United States Patent
Narayanan et al.

(10) Patent No.: US 12,623,670 B2
(45) Date of Patent: May 12, 2026

(54) ROUTE-RELATIVE TRAJECTORY GENERATION AND OPTIMIZATION COMPUTATIONS INCORPORATING VEHICLE SIDESLIP

(71) Applicant: Zoox, Inc., Foster City, CA (US)

(72) Inventors: Sriram Narayanan, San Jose, CA (US); Liam Gallagher, San Francisco, CA (US); Marin Kobilarov, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 380 days.

(21) Appl. No.: 18/072,056

(22) Filed: Nov. 30, 2022

(65) Prior Publication Data

US 2024/0174239 A1     May 30, 2024

(51) Int. Cl.
*G01C 22/00* (2006.01)
*B60W 50/00* (2006.01)
*B60W 60/00* (2020.01)
(52) U.S. Cl.
CPC ...... *B60W 50/0097* (2013.01); *B60W 60/001* (2020.02); *B60W 2520/20* (2013.01)
(58) Field of Classification Search
CPC ........... B60W 50/0097; B60W 60/001; B60W 2520/20
See application file for complete search history.

(56) References Cited

U.S. PATENT DOCUMENTS

| 2021/0318683 A1 | 10/2021 | Luo |
| 2021/0373566 A1 | 12/2021 | Agarwal |
| 2024/0294185 A1* | 9/2024 | Sato .................... B60W 30/045 |

FOREIGN PATENT DOCUMENTS

| CN | 115127576 A | * | 9/2022 |
| CN | 115127576 B | | 12/2022 |
| JP | 2005335588 A | | 12/2005 |
| KR | 101897407 B1 | * | 8/2022 |

OTHER PUBLICATIONS

PCT Search Report and Written Opinion mailed Mar. 15, 2024 for PCT Application No. PCT/US2023/081608 from PCT Summary, 13 pages.

* cited by examiner

*Primary Examiner* — Adam M Alharbi
(74) *Attorney, Agent, or Firm* — Lee & Hayes, P.C.

(57) ABSTRACT

Techniques are discussed for generating and optimizing trajectories for autonomous vehicles using route-relative numerical integration relative to a reference path. A planner component of an autonomous vehicle, for example, can receive or generate a reference path corresponding to a route through an environment. The current vehicle state, sideslip, and vehicle dynamics can be represented in a system of equations, such that the planner component can substantially simultaneously solve for subsequent trajectory states in a single convergence operation. In various examples, the subsequent trajectory states can be used to evaluate and determine candidate trajectories to control the autonomous vehicle to traverse the environment.

19 Claims, 7 Drawing Sheets

200 ⌐

ORIENTATION DIRECTION
202

VELOCITY DIRECTION
204

SIDESLIP
ANGLE 206

VEHICLE PATH
208

102

210 ⌐

ORIENTATION DIRECTION
212

SIDESLIP DIRECTION
218

SIDESLIP
ANGLE 216

102

VELOCITY DIRECTION
214

VEHICLE PATH
220

ROUTE-RELATIVE TRAJECTORY GENERATION AND OPTIMIZATION COMPUTATIONS INCORPORATING VEHICLE SIDESLIP

BACKGROUND

Autonomous vehicles use various systems and techniques to navigate through driving environments including static and dynamic objects. For instance, autonomous vehicles may utilize route planning methods to guide the vehicles through congested areas with other moving vehicles (autonomous or otherwise), moving people, stationary buildings, etc. In some examples, generating routes for an autonomous vehicle can include evaluating and/or optimizing candidate trajectories based on vehicle accelerations and steering angles associated with candidate vehicle states, which can be challenging and inefficient in resource-limited or time-limited computing environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 depicts a pictorial flow diagram illustrating an example process for determining a trajectory for a vehicle relative to a reference path, and controlling the vehicle based on the trajectory, in accordance with one or more examples of the disclosure.

DETAILED DESCRIPTION

Figure 1:
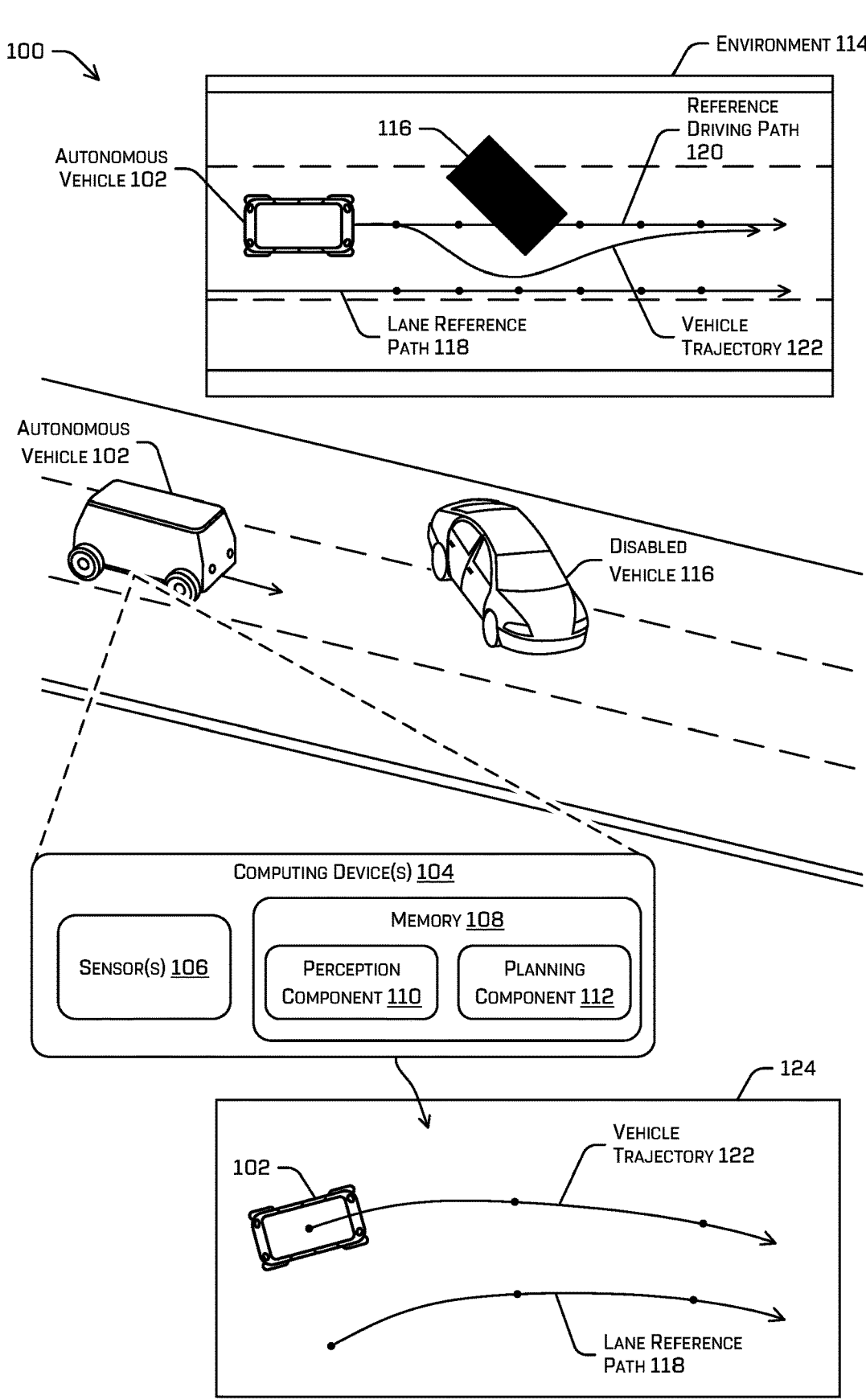
FIG. 1 illustrates an example technique of generating a trajectory for a vehicle to traverse a driving environment, relative to a reference path, in accordance with one or more examples of the disclosure.

The techniques discussed herein relate to generating and/or optimizing trajectories for autonomous vehicles using route-relative numerical integration relative to a reference path. In some examples, a planning component of an autonomous vehicle can receive or generate a reference path representing a desired route for the vehicle to traverse an environment, such as the center of a lane or other efficient driving route taking into account the various vehicles and other obstacles in the environment. To determine a trajectory for the vehicle to follow relative to the reference path, the planning component may evaluate a number of candidate trajectories based on the current state of the vehicle relative to the reference path (e.g., a lateral position offset and orientation offset), and the lateral and longitudinal dynamics of the vehicle (e.g., steering angle, velocity and/or acceleration). To evaluate a candidate trajectory, the planner component may initially determine subsequent vehicle state data associated with the candidate trajectory, such as the future position and orientation of the vehicle at a subsequent step in the candidate trajectory, as well as the arc length and/or curvature of the path that will drive to reach the subsequent trajectory step. In order to determine the subsequent vehicle state data for a candidate trajectory, various techniques are described herein including representing the current vehicle state data, vehicle sideslip angle and/or direction, and the lateral and longitudinal dynamics of the vehicle, into a system of equations. The planning component may use a root finding algorithm or other optimization technique to solve the system of equations, thereby substantially simultaneously determining the subsequent vehicle state data for the candidate trajectory. The planning component then may use the subsequent vehicle state data to evaluate the candidate trajectory with respect to one or more loss functions, and may determine a trajectory for controlling the vehicle based on the evaluations of the candidate trajectories.

For a particular trajectory (e.g., a candidate trajectory in a trajectory optimization process), for the planning component to evaluate the trajectory it may initially determine one or more subsequent vehicle states of the trajectory. In some examples, the current vehicle state and/or subsequent vehicle states of a trajectory can be determined relative to a reference path. For instance, a current vehicle state can include a lateral offset (or error) value representing the lateral distance between the current position of the vehicle and a corresponding point on the reference path, and/or an orientation offset (or error) value representing an angular difference between the current orientation (or heading) of the vehicle and the orientation (or heading) at the corresponding point on the reference path. Based on the current vehicle state data and vehicle dynamics (e.g., steering angle, velocity, acceleration, etc.), the planning component may determine a subsequent vehicle state of the trajectory, including the subsequent lateral offset and/or subsequent orientation offset of the vehicle following the trajectory.

However, when the motion dynamics of the vehicle support non-zero sideslip, it may become difficult to determine the subsequent vehicle states and/or driving path characteristics associated with the trajectory. As used herein, a sideslip (or sideslip angle) of a vehicle may refer to the angle between the orientation direction of the vehicle and the direction of the velocity of the vehicle. When the vehicle is moving forward, the sideslip direction may be the same as the velocity direction, and when the vehicle is moving in reverse, the sideslip direction may be the opposite of the velocity direction.

When the vehicle motion dynamics support non-zero sideslip, such as when the vehicle supports four-wheel steering, it can be difficult for the planning component to compute the route-relative subsequent vehicle states of a trajectory (e.g., a lateral offset and orientation offset of a next trajectory state), and the associated driving path characteristics (e.g., the curvature and/or arc length for the vehicle to drive to the next trajectory state). In some examples, to evaluate a subsequent state of a candidate trajectory, the planning component may determine the lateral offset of the subsequent state, orientation offset of the subsequent state, and the arc length (e.g., distance driven by the vehicle) to reach the subsequent state. To solve for this combination of variables, it may be useful for the planning component to know the curvature of the vehicle driving path. In situations when the vehicle is known to be moving with zero sideslip, the planning component may determine the curvature based on the steering angle (e.g., as the inverse of the turning radius). The planning component then may use the curvature to compute the arc length of the driving path to the next trajectory state. Various techniques for computing the driving path curvature, arc length, and route-relative subsequent vehicle state data (e.g., lateral offset and orientation offset) for a vehicle trajectory can be found, for example, in U.S. application Ser. No. 16/147,492, filed Aug. 28, 2018, and titled "Trajectory Generation And Optimization Using Closed-Form Numerical Integration In Rout-Relative Coordinates," the entire contents of which are herein incorporated by reference in its entirety and for all purposes.

However, when the vehicle is potentially moving at a non-zero sideslip angle, the planning component cannot determine the curvature of the driving path based solely on the steering angle. The presence of a potential sideslip angle may cause a cross-dependency between the curvature and the arc length of the driving path of the vehicle to the next trajectory state, in which curvature computation depends on the arc length and the arc length computation depends on the curvature. As a result, for motion models supporting non-zero sideslip, the planning component may be unable to solve in closed form the next vehicle state (e.g., lateral offset and orientation offset) and the path characteristics (e.g., arc length and/or curvature) of the driving path the vehicle will follow to the next vehicle state.

Therefore, in various examples the planning component may perform an optimization algorithm, such as a root finding algorithm, to solve for a system of equations representing a subsequent lateral offset of a trajectory, a subsequent orientation offset of the trajectory, and an arc length of the driving path to the associated state of the subsequent trajectory. As described below in more detail, the planning component may determine and solve, substantially simultaneously, a system of three equations representing the lateral offset, orientation offset, and arc length of a subsequent trajectory state. In some examples, the planning component may determine an initial estimate of the arc length, which may be based on the arc length of a previous trajectory segment and/or the arc length of the corresponding segment of the reference path. Based on the initial arc length estimate, the planning component may determine an initial curvature estimate, and then may utilize Newton's method to minimize the residual error resulting from the estimated curvature.

Although various examples described herein include using a root finding algorithm to solve for systems of equations representing the lateral offset of a subsequent trajectory state, the orientation offset of the subsequent trajectory state, and the curvature and/or arc length of the driving path to the subsequent trajectory state, in other examples various other optimization algorithms or techniques may be used. In some instances, the planning component may initially determine a sufficiently accurate estimated arc length of the driving path, so that the estimated arc length can be used to compute a sufficiently accurate curvature, which can be used to compute the lateral offset and heading offset of the subsequent trajectory state. Sufficiently accurate estimated arc lengths may be determined, for example, based on the arc lengths of previous trajectory segments while driving on the same curve of the same roadway, and/or based on the arc length of the corresponding segment of the reference path. In such instances, the planning component need not perform a root finding algorithm or other optimization algorithm in other to compute the subsequent vehicle state data and driving path data with sufficient accuracy.

After determining the subsequent route-relative vehicle state data and/or driving path characteristics for a vehicle trajectory, the planning component may use one or more loss functions to optimize the trajectory with respect to the reference path. For example, the planning component may use any number of loss functions, alone or in combination, including but not limited to loss functions based on the distance between the vehicle and an object in the environment, based on the distance between the vehicle and a corresponding point on the reference path, based on one or more target velocities of the vehicle, based on one or more target steering angles, etc. Additionally or alternatively, loss functions may be based on one or more of a target lateral acceleration(s), target longitudinal acceleration(s), target trajectory curvature(s), target trajectory curvature rate(s), and/or passenger comfort metrics, safety metrics, route progress metrics, legality metrics, and the like.

In some instances, generating an optimized trajectory can include executing a separate optimization algorithm to substantially simultaneously evaluate a plurality of loss functions to determine the acceleration(s) and/or steering angles that correspond to an optimized (e.g., lowest cost) trajectory for the vehicle. Such techniques for trajectory optimization can be found, for example, in U.S. application Ser. No. 16/147,492, titled "Trajectory Generation And Optimization Using Closed-Form Numerical Integration In Rout-Relative Coordinates," which is incorporated by reference herein. Thus, various techniques described herein may include generating/optimizing a vehicle trajectory by performing a number of iterations of a first optimization algorithm in a loop, within a second optimization algorithm. As described above, the first optimization algorithm may be used to solve for the subsequent vehicle state data (e.g., lateral offset and orientation offset) and driving segment arc length for a vehicle trajectory, and may be performed iteratively in a loop for any number of trajectory variations or refinements. The first optimization algorithm may be performed separately (e.g., in a loop) for any number of trajectory variations or refinements (e.g., changes or perturbations to accelerations or steering angles) at each trajectory step. Then, the second (outer) optimization algorithm may correspond to the optimization of the trajectory based on the loss functions to determine an optimal or lowest-cost trajectory for controlling the vehicle.

For either or both of the optimization algorithms described herein, the optimization operations may include using (e.g., evaluating or executing) a differential dynamic programming (DDP) algorithm, although other algorithms may be used as well. For either or both optimization algorithms, the projected stage-wise Newton method described herein may involve multiple iterations (e.g., backward passes and/or forward passes), these optimizations also may only require a single execution of the DDP algorithm for a single convergence to generate optimized vehicle state data and/or an optimized trajectory for the autonomous vehicle.

The techniques described herein, such as using root finding algorithms and/or other optimization algorithms to determine the subsequent vehicle states, and driving segment curvatures and/or arc lengths associated with a trajectory, may improve the functioning of autonomous vehicles by providing faster and more robust generation of vehicle controls. As noted above, certain conventional trajectory optimization techniques may be incompatible with vehicle motion models that support non-zero sideslip angles. Such techniques may be unable to perform the efficient and accurate trajectory optimization provided by the techniques herein for vehicles performing reversing maneuvers and/or for vehicles having four-wheel steering capabilities. For instance, conventional techniques for determining a combination of subsequent vehicle state data and associated segment curvature and/or arc length data for a trajectory may attempt to iteratively and independently optimize the lateral offset, the orientation offset, and the arc length using a sequence of separate computing passes. In contrast, the techniques discussed herein utilize a single algorithm for optimizing the subsequent vehicle state data (e.g., lateral offset and orientation offset) and the associated segment arc length, solving for the variables efficiently in a single algorithm. Thus, these techniques may provide a reduction in processing and/or memory requirements due to the reduction in iterations associated with individual determinations of parameters. Accordingly, in some instances, the operations discussed herein may require less processing power, and/or may require less memory than conventional trajectory generation and/or optimization techniques. These techniques also may improve vehicle safety and driving efficiency by quickly determining improved (e.g., lowest cost or optimized) driving trajectories for controlling autonomous vehicles in crowded and complex driving environments. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context, or in any system generating a trajectory. Additionally, the techniques described herein can be used with real data (e.g., captured using sensor(s)), simulated data (e.g., generated by a simulator), or any combination thereof.

FIG. 1 illustrates an example scenario 100 including an autonomous vehicle 102 configured to generate and/or optimize a trajectory through a driving environment, relative to a reference path corresponding to a driving route, as described herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to trajectory-finding in video games, manufacturing, augmented reality, etc.

According to the techniques discussed herein, the vehicle 102 may receive sensor data from sensor(s) 106 of the vehicle 102. For example, the sensor(s) 106 may include location sensors (e.g., a global positioning system (GPS) sensor), inertia sensors (e.g., an accelerometer sensor, a gyroscope sensor, etc.), magnetic field sensors (e.g., a compass), position/velocity/acceleration sensors (e.g., a speedometer, a drive system sensor), depth position sensors (e.g., a lidar sensor, a radar sensor, a sonar sensor, a time of flight (ToF) camera, a depth camera, and/or other depth-sensing sensor), image sensors (e.g., cameras), audio sensors (e.g., microphones), and/or environmental sensors (e.g., a barometer, a hygrometer, etc.). In some examples, a simulated sensor may correspond with at least one of the sensor(s) 106 on the vehicle 102 and in a simulation, one or more of sensor(s) 106 may be simulated. In some examples, the position of a simulated sensor may correspond with a relative position of one of the sensor(s) 106 to the vehicle 102.

The sensor(s) 106 may generate sensor data, which may be received by computing device(s) 104 associated with the vehicle 102. However, in other examples, some or all of the sensor(s) 106 and/or computing device(s) 104 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may comprise computing device(s) 104 that may include one or more ML models and/or the navigation systems discussed herein. For example, the computing device(s) 104 comprise a memory 108 storing a perception component 110 and/or a planning component 112. As discussed below, the planning component 112 may include various components configured to generate a trajectory to control the vehicle 102 through the environment, relative to a reference path. In some examples, the planning component 112 may determine and evaluate a number of candidate trajectories, each of which may include a sequence of candidate actions, and to determine a particular trajectory (e.g., an optimized trajectory) for controlling the vehicle within the scenario. The sensors 106, perception component 110 and/or planning component 112 may comprise the hardware and/or software for conducting the operations discussed herein related to trajectory determination and navigation of the autonomous vehicle 102. The various navigational systems described herein may comprise more or fewer components, but the perception component 110 and/or planning component 112 are given as a non-limiting example for the sake of comprehension.

In some examples, the various vehicle navigation systems and functionalities described herein may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In the example scenario 100, the autonomous vehicle 102 may be driving within an environment 114 following a current trajectory. In order to determine a subsequent trajectory for the vehicle to follow (e.g., at one or more future time steps), the autonomous vehicle 102 may receive and/or determine a driving route between a start state (e.g., the current state of the autonomous vehicle 102) and an end state of the driving route (e.g., representing a location, velocity, and/or pose, etc., that the autonomous vehicle 102 intends to achieve). The planning component 112 may determine the driving route for the autonomous vehicle 102 based at least in part on sensor data, map data, and/or based on an intended destination of a mission (e.g., received from a passenger, from a command center, etc.).

As noted above, references to a "state" or "vehicle state" may include geometric state data, such as position (or location) and/or a pose (e.g., position and/or orientation/ heading including yaw and steering angle) of a vehicle. Additionally, in some examples, a vehicle state may comprise any combination of geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.). A "trajectory" may refer to a sequence of states through which the vehicle may traverse from a start state to an end state. For example, a trajectory may be defined as a sequence of spatiotemporal states, in which each state is specified by any combination of an x-position, ay-position, a yaw, a yaw rate, a steering angle, a steering angle rate, a velocity, and/or an acceleration, etc. There may be any number of possible trajectories that the vehicle can take to traverse from a start state to an end state (or target state), including different positions, steering angles, velocities, and/or accelerations at the different intermediate states in the trajectory.

As the autonomous vehicle 102 operates within the environment, it may receive map data of the environment (e.g., from a local or remote map system), and perception data (e.g., sensor data) from the perception component 110. The map data may include, for example, road data determined based on a map of the driving environment and/or localizing the autonomous vehicle 102 within the environment. For instance, the map data may include data associated with any number of road segments (e.g., lane segments) in the driving environment, such as the location (e.g., boundaries), size (e.g., length and width), and shape (e.g., curvature) of the road segment, as well as additional attributes of the road segment such as directionality, speed limit, gradient, road surface, etc.

The autonomous vehicle 102 also may receive sensor data from sensor(s) 106 of the autonomous vehicle 102. The perception component 110 may include one or more ML models and/or other computer-executable instructions for detecting, identifying, segmenting, classifying, and/or tracking objects from sensor data collected from the environment of the autonomous vehicle 102. For example, data generated by the perception component 110 may be used by the autonomous vehicle 102 to localize its position within the driving environment relative to the map data. In some instances, the perception component 110 also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

As the autonomous vehicle operates to reach the end state of its driving route, it may encounter a scenario like example scenario 100 in which a trajectory planner that is reliant on a lane reference (e.g., a relative spatial designation determined based at least in part on a map and/or localizing the autonomous vehicle 102) to generate a driving path or trajectory may not accurately and/or efficiently generate a path. For example, objects and/or other obstructions, such as disabled vehicle 116, may block some or all of lanes of the roadway, and could cause a trajectory planner to stop the vehicle and/or call teleoperations because the lane does not have sufficient room for the autonomous vehicle to pass.

As discussed in the examples herein, the planning component 112 may use the map data and/or perception data to determine one or more reference paths for the autonomous vehicle 102 to follow to traverse the driving environment 114. In this example, the planning component 112 may initially receive or determine a lane reference path 118 based on the map data (e.g., roadway or lane boundaries) of the driving environment 112. In some examples, the lane reference path 118 may correspond to a lane dividing lane or other fixed path determined by the planning component 112 to define a coordinate system for the environment. Additionally or alternatively, the planning component 112 may determine a reference driving path 120 that continuously and feasibly connects the start state of the driving route (e.g., the current vehicle state) with the intended end state of the driving route. In some examples, the reference driving path 120 may represent a predetermined desirable driving trajectory for a vehicle to follow to traverse a particular driving route. For instance, the reference path 118 can correspond to a centerline of a road segment (or any drivable surface) proceeding at the speed limit of the roadway. The reference driving path 120 may be generated based on, for example, a minimum or maximum longitudinal acceleration or velocity, a maximum steering angle, vehicle dynamics (e.g., a notion that the wheels do not slip, etc.), etc. As shown in this example, the reference driving path 120 can be generated independently of static obstacles in an environment and thus does not traverse around the disabled vehicle 116; however, in other examples, a reference driving path 120 may be based at least in part on static obstacles in the environment.

As shown in this example, the planning component 112 may determine a vehicle trajectory 122 that is different from the lane reference path 118 and/or the reference driving path 120. As described below in more detail, vehicle trajectory 122 may be an optimized trajectory determined as a lowest-cost trajectory based on loss function that take into account the static objects in the environment, such as the disabled vehicle 116, along with any number of additional costs and/or loss functions based on safety, passenger comfort, route progress, etc. For instance, the planning component 112 may determine the vehicle trajectory 122 as an improved or lowest cost (e.g., optimal) trajectory by executing a tree search including determining a combination of heuristics-based and ML prediction-based candidate actions, and evaluating the candidate actions taking into account the future predicted driving scene(s) of the environment 114, including the predicted trajectories of the autonomous vehicle 102 and the predicted trajectories/states of other agents or objects in the environment. In some cases, the vehicle trajectory 122 may represent an optimal and/or lowest-cost trajectory determined by the planning component 112 after evaluating a number of kino-dynamically feasible trajectories determined by a tree search technique, based on safety costs (e.g., potential interactions with objects/agents), passenger comfort costs, route progress costs, etc.

In this example, the planning component 112 has determined a single vehicle trajectory 122 for the autonomous vehicle 102 to traverse the environment 114. In other examples, the planning component 112 may determine any number of alternative low-cost trajectories using search trees and/or the various other techniques described herein. To determine a vehicle trajectory 122, the planning component 112 may generate, substantially simultaneously, a plurality of potential vehicle control actions for controlling the motion of the autonomous vehicle 102 in accordance with a receding horizon technique (e.g., 1 micro-second, half a second, multiple seconds, etc.) based at least in part on the lane reference path 118 and/or the reference driving path 120. The planning component 112 may determine one or more potential vehicle control actions from which to generate a drive control signal that can be transmitted to drive components of the autonomous vehicle 102, to control the vehicle to traverse the vehicle trajectory 122.

As indicated above, the reference driving path 120 may represent a feasible and/or desirable trajectory for the vehicle to follow from its current state to a target state on the driving route toward its intended destination. However, for any number of reasons, the vehicle trajectory 122 may include different states and follow a different driving path to arrive at positions that are different from those of the reference driving path 120. In this example, the vehicle trajectory 122 may diverge from the reference driving path 120 to avoid the disabled vehicle 116. In other examples, due to the complexity and variability of vehicles operating in real-world driving environments, as well as the complexity and variability of the environments themselves, the various systems of the autonomous vehicle 102 (e.g., sensor systems, localization systems, map data, vehicle drive modules and drive systems, etc.) may fail to precisely model the performance capabilities of the autonomous vehicle 102 and/or the environment in which the vehicle is driving. For example, the exact response of the autonomous vehicle 102 to an acceleration command, braking command, or steering command, etc., may depend on several different complex and dynamic mechanical, electromechanical, hydraulic, and/ or electronic systems within the vehicle drive system configured to control the movement and operation of the vehicle. Each of these systems may have additional components and subcomponents which may be subject to failures, wear and tear, and potential errors or malfunctions, etc. Thus, the precise position and/or state (e.g., velocity, acceleration, yaw, steering angle, etc.) at which the autonomous vehicle 102 arrives following a sequence of commands may be different than an expected state, based on any number of dynamic environmental variables, such as road surface, temperature, wind speed and direction, etc. Additionally or alternatively, the planning component 112 may determine that the reference driving path 120 is a sub-optimal trajectory for the autonomous vehicle 102 to follow; based on one or more loss functions executed by the vehicle to improve safety, passenger comfort, safety metrics, route progress, etc.

The environment 124, which may represent a portion of the environment 114, illustrates a situation in which the autonomous vehicle 102 is following a vehicle trajectory 122 different from the reference driving path 120. The techniques described herein relate to generating and optimizing the vehicle trajectory 122, based at least in part on the relative differences in position and vehicle heading between the vehicle trajectory 122 and a reference path. For example, various techniques described herein include determining lateral offsets and angular offsets between a vehicle trajectory 122 and a reference path. In these various examples, the reference path from which the lateral offsets and angular offsets are determined may be the lane reference path 118 (as shown in this example) and/or may be the reference driving path 120. As described below in more detail, optimizing the vehicle trajectory 122 may include executing loss functions based on the lateral offset and orientation offset of the autonomous vehicle 102 relative to the reference path (e.g., lane reference path 118 or reference driving path 120), as well as additional loss function factors, thereby weighing the trajectory optimization in favor of returning toward the reference path.

Figure 2A:
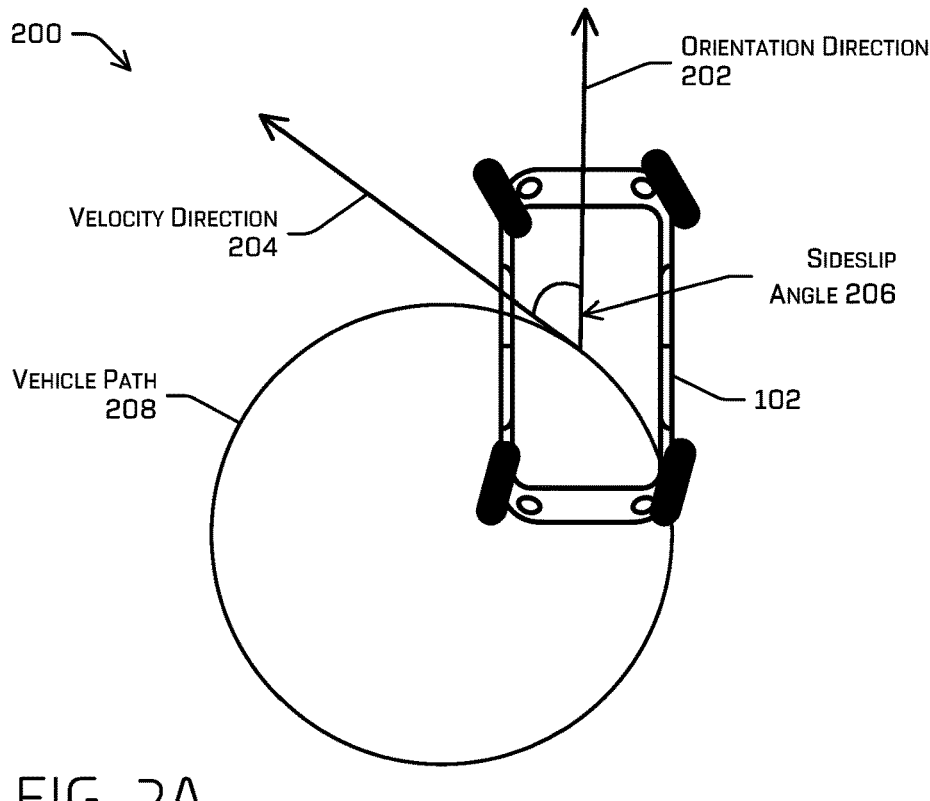
FIGS. 2A and 2B illustrate example vehicle state diagrams including non-zero vehicle sideslip angles, in accordance with one or more examples of the disclosure.
Figure 2B:
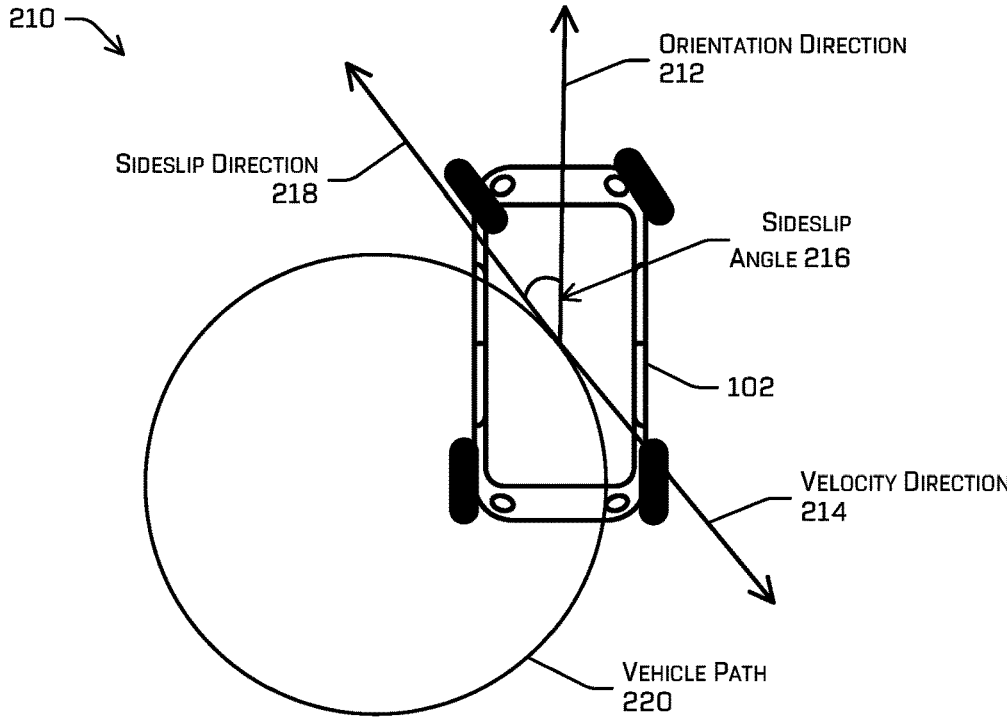

FIGS. 2A and 2B depict two different vehicle states in which the autonomous vehicle 102 is moving in a velocity direction with a non-zero sideslip angle. As noted above, a sideslip angle of the autonomous vehicle 102 may refer to the angle between the heading (or orientation) of the vehicle and the direction of the velocity of the vehicle. In some cases, whether or not an autonomous vehicle 102 can drive with non-zero sideslip angles may depend on the particular reference location on the vehicle from which position and velocity are measured (e.g., a mid-point position on the front or rear axle, or a point between the front and rear axles, etc.). For example, mirrored four-wheel steering may result in zero sideslip relative to a center point on the vehicle. However, the same vehicle movements may produce a different velocity when measured relative to a different point on the vehicle (e.g., a center point on the rear axle), and thus may result in non-zero sideslip relative to that point. Vehicles capable of four-wheel steering, crab-walk steering, etc., may routinely perform maneuvers with non-zero sideslip angles relative to some (or all) of the potential reference points on the vehicle.

Diagram 200 shown in FIG. 2A depicts an autonomous vehicle 102 performing a four-wheel steering maneuver. In this example, arrow 202 shows the orientation (or heading) of the vehicle 102, arrow 204 shows the direction of the velocity of the vehicle 102 (which is also the sideslip direction), and angle 206 represents the current sideslip angle of the vehicle 102. Additionally, the circle 208 shows the arc of the current path of the vehicle 102 within its four-wheel steering maneuver.

Diagram 210 shown in FIG. 2B depicts the autonomous vehicle 102 performing a steering maneuver while reversing. In this example, arrow 212 shows the orientation (or heading) of the vehicle 102, arrow 214 shows the direction of the velocity of the vehicle 102, arrow 216 shows the sideslip direction of the vehicle (which is opposite the velocity direction because the vehicle 102 is moving in reverse), and angle 218 represents the current sideslip angle of the vehicle 102. Additionally, the circle 220 shows the arc of the current path of the vehicle 102 within its reverse-steering maneuver.

Figure 3:
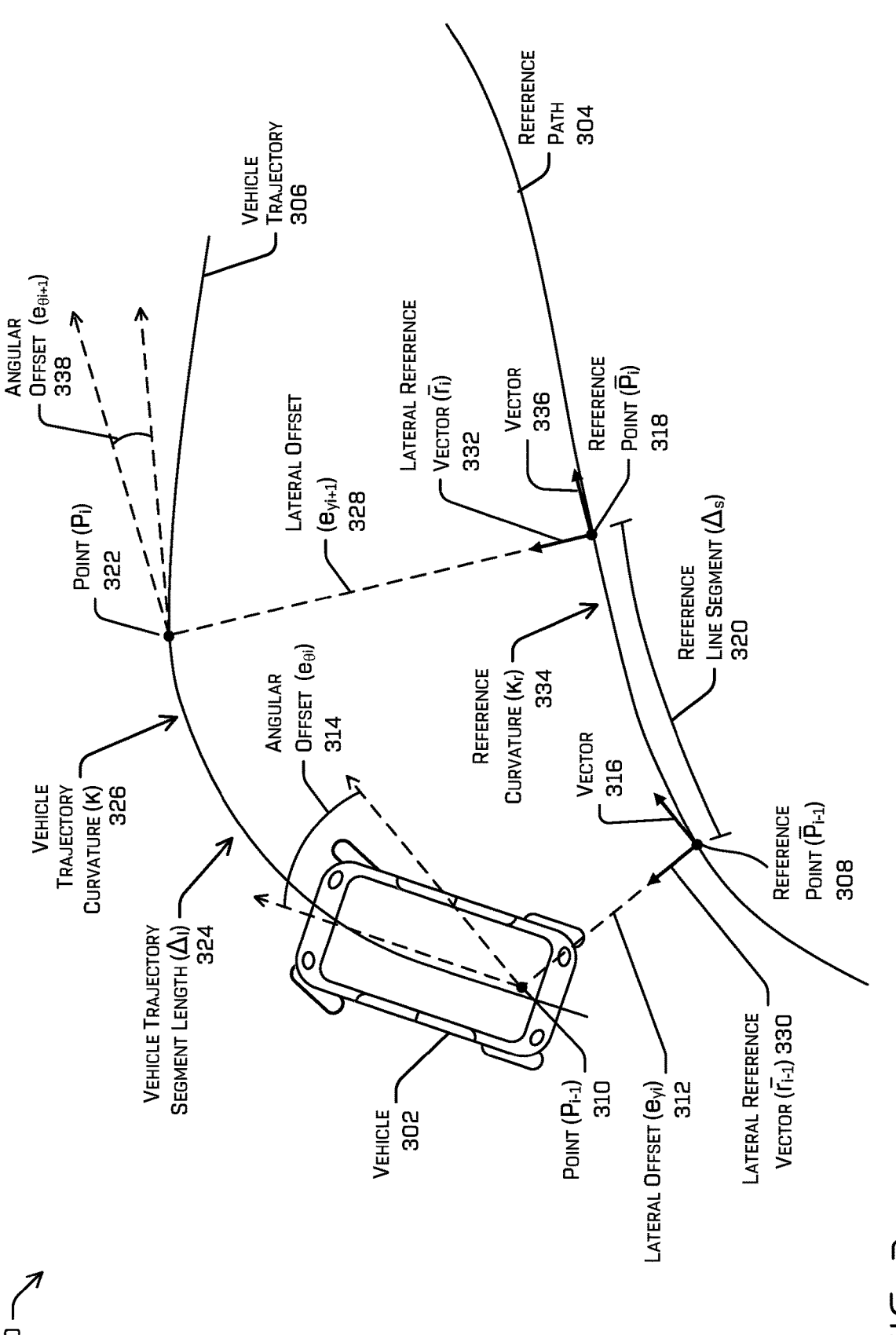
FIG. 3 illustrates an example driving environment including a determined vehicle trajectory relative to a reference path, in accordance with one or more examples of the disclosure.

FIG. 3 shows an example driving environment 300 including a trajectory generated by an autonomous vehicle 302 relative to a reference path. In this example, FIG. 3 depicts the example environment 300 including the vehicle 302, a reference path 304, and a separate vehicle trajectory 306 (e.g., an optimized trajectory), in accordance with embodiments of the disclosure.

As noted above, the reference path 304 may correspond to a lane (or roadway) reference path associated with the driving route of the vehicle (e.g., lane reference path 118), or may correspond to a reference driving path such as centerline of a road segment or other desired driving route within a drivable surface (e.g., reference driving path 120). In various examples, the reference path 304 can be generated by or received by a planning component 112 of the vehicle 302, based at least in part a minimum or maximum longitudinal acceleration or velocity, a maximum steering angle, vehicle dynamics (e.g., a notion that the wheels do not slip, etc.), etc.

With respect to a reference point ($\bar{p}_{i-1}$) 308 of the reference path 304, a point ($p_{i-1}$) 310 of the vehicle 302 can be defined at least in part by a lateral offset ($e_{y_i}$) 312 relative to the reference path 304 and an orientation offset ($e_{\theta_i}$) 314 (also referred to as an angular offset, or as a yaw or heading error). In some instances, the orientation offset 314 can correspond to a difference in an angle between an orientation and/or direction of travel of the vehicle 302 and a vector 316 associated with a direction of the reference path 304 at the reference point 308.

A reference point ($\bar{p}_i$) 318 of the reference path 304 can be separated from the reference point 308 by a segment ($\Delta_s$) 320. In some instances, a length of the segment 320 may be fixed from point to point, and in some instances the length of the segment 320 may be determined based on the vehicle 302, road conditions (e.g., a speed limit, surface conditions, etc.), dynamics of the vehicle 302, processor availability, and the like. In some instances, the reference point 318 can be further associated with a lateral offset from the reference path 304.

With respect to the reference point ($\bar{p}_i$) 318 of the reference path 304, a point ($p_i$) 322 on the vehicle trajectory 306 can be defined at least in part by an intersection between a line (e.g., a trajectory segment) having an arc length ($\Delta_l$) 324 and a curvature ($\kappa$) 326, and a line extending from the reference point 318 defining a lateral offset ($e_{y_{i+1}}$) 328 relative to the reference path 304 at the reference point 318. Additionally or alternatively, the point ($p_i$) 322 on the vehicle trajectory 306 can be defined at least in part by the orientation offset ($e_{\theta_i}$) 338 (also referred to as a yaw or heading error). As shown in this example, the orientation offset 338 can correspond to a difference in an angle between the orientation and/or direction of travel of the vehicle 302 and a vector 336 associated with a direction of the reference path 304 at the reference point 318. As described above, in some examples the planning component 112 may initially solve for the arc length ($\Delta_l$) 324 of the segment of the trajectory 306, and may use the arc length ($\Delta_l$) 324 and the lateral offset ($e_{y_{i+1}}$) 328 to solve for the curvature ($\kappa$) 326 of the segment. Additionally or alternatively, the planning component 112 may initially solve for the curvature ($\kappa$) 326 of the segment, and may use the curvature ($\kappa$) 326 and the lateral offset ($e_{y_{i+1}}$) 328 to solve for the arc length ($\Delta_l$) 324.

In some instances, the segment defined by the curvature ($\kappa$) 326 can be a motion primitive generated in accordance with the techniques discussed in U.S. patent application Ser. No. 15/843,596, filed Dec. 15, 2017. Further, the segment defined by the desired curvature 124 can be generated in accordance with the techniques discussed in U.S. patent application Ser. No. 15/843,512, filed Dec. 15, 2017. Application Ser. Nos. 15/843,596 and 15/843,512 are herein incorporated by reference, in their entirety.

The reference point 308 can be associated with a lateral reference vector ($\bar{r}_{i-1}$) 330 (e.g., perpendicular to the vector 316) and the vector 316 (e.g., tangent to the reference point 308 or associated with a direction of the reference path 304 at the reference point 308).

The reference point 318 can be associated with a lateral reference vector ($\bar{r}_i$) 332 (e.g., perpendicular to the vector 336) and the vector 336 (e.g., tangent to the reference point 318 or associated with a direction of the reference path 304 at the reference point 318).

In some instances, the vehicle 302 can be defined in route-frame coordinates by a state $x=(e_y, e_\theta, l, v)$, where $e_y$ is the lateral error, $e_\theta$ is the orientation (or heading) error, $l$ is an arc length, and $v$ is the body-fixed longitudinal velocity. The controls $u=(\kappa, a)$ can define a curvature $\kappa$ and the longitudinal acceleration $\alpha$.

An arc length of the reference path 304 can be defined as s, and accordingly, the ordinary differential equation with respect to s can be represented as:

$$e_y' = \tan e_\theta (1 - \kappa_r e_y) \tag{1}$$

-continued $$e_\theta' = \frac{\kappa(1 - \kappa_r e_y)}{\cos e_\theta} - \kappa_r \tag{2}$$

$$l' = \frac{1 - \kappa_r e_y}{\cos e_\theta} \tag{3}$$

$$v' = \frac{a}{v \cos e_\theta}(1 - \kappa_r e_y) \tag{4}$$

where all variables can be understood as functions of s and thus $$e_y'(s) \equiv \frac{\partial}{\partial s} e_y(s),$$

and $\kappa_s(s)$ corresponds to the reference curvature (e.g., curvature ($\kappa_r$) 334).

In some instances, the direct control model (described above in equations (1)-(4)) can be extended to a smooth control model for which the inputs are the curvature ($\kappa_d$) (e.g., 326) and acceleration $\alpha_d$ which can be achieved after some displacement s (e.g., the segment 320).

In some instances, in the smooth model, the actual curvature and acceleration at $s+\Delta s$ correspond to the curvature (e.g., curvature ($\kappa$) 326) and acceleration applied at s, which can be expressed as:

$$\kappa(s + \Delta s) = \kappa d(s), \tag{5}$$

$$a(s + \Delta s) = ad(s). \tag{6}$$

In some examples, generating an optimized trajectory can include performing efficient and accurate integration using a fixed arc length step, $\Delta s$ (e.g., 320), which can be used as a basis for trajectory optimization. Let $x_i \in \mathbb{R}^n$ denote the state at $s_i$ (e.g., the i-th point along curve s), and accordingly, the integration can be defined using the mapping:

$$x_{i+1} = f_i(x_i, u_i) \tag{7}$$

which transforms the current state into the next state at point $s_{i+1} = s_i + \Delta s$.

In some examples, generating the optimized trajectories (e.g., a series of states) $\{x_0, x_1, \ldots, x_N\}$ corresponding to a control sequence $\{u_0, u_1, \ldots, u_{N-1}\}$ may include minimizing the following cost function:

$$J_0 = L_N(x_N) + \sum_{i=0}^{N-1} L_i(x_i, u_i), \tag{8}$$

subject to $x_{i+1} = f_i(x_i, u_i),$ $$u_k \in U_k, \quad C_N x_N - \bar{d}_N = 0,$$

where $L_i$ are given cost functions, $U_k$ is a convex set and $C_N \in \mathbb{R}^{m \times n}$ has full rank $m \le n$, where $C_N$ is a selection matrix (e.g., a matrix used to determine only those relevant portions of the state $x_N$), $x_N$ corresponds to a last state (or the n-th state), and $d_N$ corresponds to a desired control at the last state. Such costs may be any one or more of the costs described in detail herein.

Techniques for generation and/or optimization of trajectories for the vehicle 302 to follow (e.g., vehicle trajectory 306), relative to reference trajectories (e.g., reference path 304) is discussed below in connection with FIG. 4, as well as throughout this disclosure.

Figure 4:
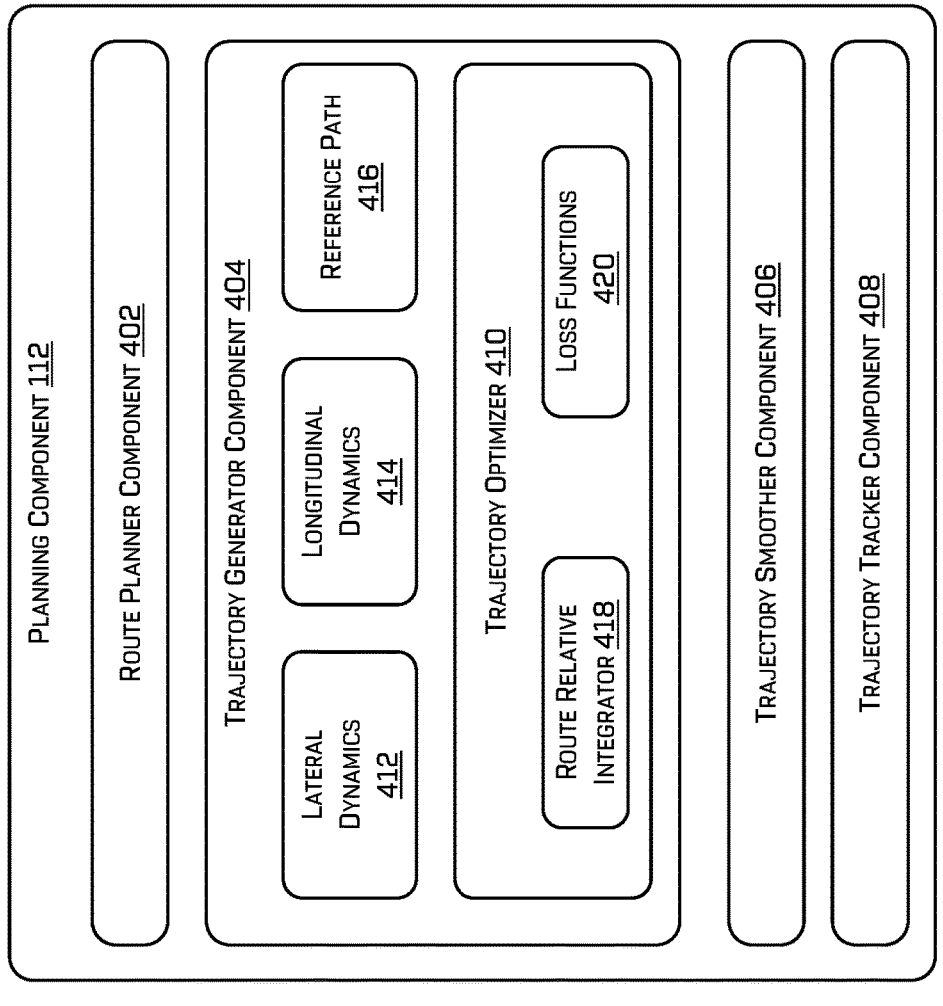
FIG. 4 depicts an example planning component for generating a vehicle trajectory, in accordance with one or more examples of the disclosure.

FIG. 4 depicts a system diagram 400 of an example planning component 112 configured to generate and/or optimize a route-relative trajectory for an autonomous vehicle, relative to a reference path generated based on the driving route of the vehicle. In this example, the planning component 112 includes a number of subcomponents configured to interact to generate trajectories for the vehicle, including a route planner component 402, a trajectory generator component 404, a trajectory smoother component 406, and a trajectory tracker component 408. As described below in more detail, the trajectory generator component 404 may include a trajectory optimizer 410 configured to determine a vehicle trajectory (e.g., an optimized or lowest-cost trajectory) relative to a reference path. In some examples, the planning component 112 may include vehicle dynamics models (e.g., lateral dynamics 412 and longitudinal dynamics 414) that support non-zero sideslip of the vehicle. In such examples, the trajectory optimizer 410 may receive or generate a reference path via a reference path component 416, and may use route-relative integrator 418 to determine subsequent vehicle state data for trajectories relative to the reference path (e.g., a lateral offset, orientation offset) and driving segment path data (e.g., segment arc length and/or curvature). After determining the subsequent vehicle state data and segment path data, the trajectory optimizer 410 may use various loss functions 420 to evaluate, modify, and/or optimize the trajectory determined for controlling the vehicle.

In general, the planning component 112 may determine the trajectory for an autonomous vehicle 102 to follow to traverse through an environment. In some instances, the route planner component 402 can be configured to determine a most efficient route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. In at least one example, the route planner component 402 can perform a search, such as a graph search, on top of a map to identify a route to guide the autonomous vehicle from a first location to a second location. In at least one example, the route planner component 402 can utilize a graph traversal algorithm to identify a route to guide an autonomous vehicle from a first location to a second location. Graph traversal algorithms can include algorithms for unweighted graphs (e.g., breadth-first search, depth-first search, greedy best-first, A* search, etc.) and/or weighted graphs (e.g., Dijkstra's algorithm, weighted A* search, etc.).

In some examples, the route planner component 402 can identify two or more candidate routes for guiding the autonomous vehicle 102 from the first location to the second location. In such examples, the route planner component 230 can rank the two or more candidate routes based on route planning constraint(s). Route planning constraint(s) can include rules of the road, travel time, travel distance, etc. In at least one example, the route planner component 402 can determine that a top-ranking candidate route is the route for guiding the autonomous vehicle 102 from the first location to the second location. The route planner component 402 can output a sequence of waypoints corresponding to the route to the trajectory generator component 404.

The trajectory generator component 404 may receive the route (e.g., the sequence of waypoints) and can generate an instruction for guiding the autonomous vehicle 102 along at least a portion of the route from the first location to the second location. In at least one example, the trajectory generator component 404 can determine how to guide the autonomous vehicle 102 from a first waypoint in the sequence of waypoints to a second waypoint in the sequence of waypoints. In some examples, the instruction can be a trajectory, or a portion of a trajectory. In such examples, the trajectory generator component 404 may generate a sequence of actions (e.g., sequences of velocities and/or accelerations, and associated steering angles) to guide the autonomous vehicle 102 along the route. In some cases, the trajectory generator component 404 may generate various actions in the alternative. In other examples, the instruction can be a policy. A policy can be used to determine a trajectory of the autonomous vehicle 102 based on real-time processed sensor data received from sensor(s) on the autonomous vehicle 102.

As shown in this example, trajectory generator component 404 can include the lateral dynamics component 412, the longitudinal dynamics component 414, the reference path component 416, and the trajectory optimizer component 410. In some instances, the lateral dynamics component 412 can be used to define lateral dynamics (e.g., a steering angle) of the vehicle 102, and the longitudinal dynamics component 414 can be used to define longitudinal dynamics (e.g., an acceleration) of the vehicle 102. As described above, the reference path component 416 can be configured to generate an "ideal" route based at least in part on the route provided by the trajectory generator component 404.

The equations used by the lateral dynamics component 412 and the longitudinal dynamics component 414 are described in more detail in U.S. application Ser. No. 16/147, 492, titled "Trajectory Generation And Optimization Using Closed-Form Numerical Integration In Rout-Relative Coordinates," which is incorporated by reference herein. For example, the lateral dynamics component 412 may determine the end-point of the arc corresponding to the system motion with curvature $\kappa_i$ resulting in heading error $e_{\theta_{i+1}}$ using the equation:

$$p_i(e_{\theta_{i+1}}) = \frac{1}{\kappa_i}\left( \begin{array}{c} \sin(e_{\theta_{i+1}} + \overline{\theta}_i) - \sin e_{\theta_i} \\ \cos e_{\theta_i} - \cos(e_{\theta_{i+1}} + \overline{\theta}_i) + e_{y_i}\kappa_i \end{array} \right) \qquad (9)$$

The lateral dynamics component 412 also may determine an integrator update step equivalent to finding $(e_{\theta_{i+1}}, e_{y_{i+1}})$ which satisfies the equation:

$$pi(e_{\theta_{i+1}}) = \overline{p}i + e_{y_{i+1}}\overline{r}i, \qquad (10)$$

where $$\overline{r}_i = \overline{R}_i\binom{0}{1}$$

is the lateral unit vector of the relative reference rotation.

The longitudinal dynamics component 414 may define longitudinal dynamics of the vehicle 102 corresponds to computing the traveled arc length using the following equation:

$$\Delta l_i = \begin{cases} \dfrac{e_{\theta_{i+1}} + \overline{\theta}_i - e_{\theta_i}}{\kappa_i} & \text{for } \kappa_i \neq 0 \\ \left\| \overline{P}_i + e_{y_{i+1}} \overline{r}_i \right\| & \text{otherwise} \end{cases} \quad (11)$$

As shown in this equation, the arc length of the segment traveled by the vehicle between adjacent trajectory steps (e.g., the arc length between point $(p_{i-1})$ 310 and point $(p_i)$ 322) can be computed by dividing the change in heading by the curvature, or by taking the pose delta when curvature is near zero. Equation (11) above may be applied when the motion dynamics of the vehicle 102 do not model sideslip.

However, as noted above, certain vehicle motion models may support non-zero sideslip. In such examples, a different equation may be used to determine curvature $\kappa$. For instance, instead of computing $\kappa$ as the inverse of the turning radius at any particular point, the updated set of equations below may compute $\kappa$ based on spatial yaw rate $\eta$, and the sideslip angle $\beta$.

$$\eta_i = \frac{\partial h}{\partial l_i} \quad (12)$$

$$\kappa = \overline{\eta} + \frac{\Delta \beta}{\Delta l} \quad (13)$$

$$\kappa = \frac{\eta_i + \eta_{i+1}}{2} + \frac{\beta_{i+1} - \beta_i}{\Delta l} \quad (14)$$

$$\kappa = \begin{cases} \dfrac{\eta_i + \eta_{i+1}}{2} + \dfrac{\sin^{-1}(l_r \eta_{i+1}) - \sin^{-1}(l_r \eta_i)}{\Delta l}, & \text{for two-wheeled steering} \\ \dfrac{\eta_i + \eta_{i+1}}{2}, & \text{for mirrored} \\ & \text{four-wheel steering} \end{cases} \quad (15)$$

As shown above in equation (12), the spatial yaw rate $\eta$ can be calculated as the derivative of heading angle $(\partial h)$ with respect to distance traveled (or arc length) of the vehicle $(\partial l)$. As shown in equation (13), the curvature value for a trajectory segment $(\kappa)$ can be computed by summing the average spatial yaw rate across the trajectory segment $(\overline{\eta})$ with the change in sideslip $(\Delta \beta)$ over the distance traveled (or arc length) $(\Delta l)$ for the trajectory segment. In this example, Equation (14) is a restatement of Equation (13). Additionally, the bottom half of Equation (15) is also a restatement in instances (e.g., for mirrored four-wheel steering) where sideslip can be assumed to be zero.

In contrast, in the top half of equation (15), for two-wheeled steering in motion models (e.g., where vehicle states may have a non-zero sideslip angle), Equation (14) has been restated to solve for sideslip using the vehicle kinematics (e.g., accounting for no lateral motion of the vehicle) in which the sideslip angle $(\beta)$ is defined based on the spatial yaw rate $(\eta)$ and the distance $(l_r)$ from the rear axle of the vehicle to origin (e.g., the zero slip point) of the vehicle. As shown in this example, computing the arc length (e.g., distance traveled by the vehicle) of the trajectory segment also may depend on the curvature of the segment. As a result, in order to solve for the curvature $\kappa$ (or arc length $\Delta l$) of a trajectory segment, while also solving for the lateral offset and the orientation offset of the trajectory segment relative to the reference path, the trajectory optimizer 410 may generate a system of three equations relating to curvature, arc length, spatial yaw rate, position, and orientation of the vehicle. In some examples, these three-equation systems cannot be solved in closed form.

For these reasons, the cross-dependency between curvature and arc length of a trajectory segment may present computational challenges for two-wheel steering modes and independent four-wheel steering. However, for mirrored four-wheel steering, sideslip about the origin for the vehicle may be assumed to be zero, and thus a closed-form solution can be computed. For instance, in a mirrored four-wheel steering approach, the route-relative integrator 418 may compute the lateral offset of a trajectory segment (e.g., lateral offset $e_{y_{i+1}}$ 328) and the orientation offset of the trajectory segment (e.g., angular offset $e_{\theta_{i+1}}$ 338), based on the position of the initial vehicle state $(x_i)$ and the reference pose $(p_i)$. In such examples, the route-relative integrator 418 may compute the sine and cosine of the orientation offset $(e_{\theta,i})$, which may be computed without needing any trigonometry and by applying transformations to the vehicle orientation angle, side slip direction vector, and reference direction vector.

However, as described above, when accounting for a sideslip angle (e.g., for two-wheel steering and independent four-wheel steering), it may be difficult or impossible to find a closed-loop solution to solve for the lateral offset $(e_{y,i+1})$, orientation offset $(e_{\theta,i+1})$, and the arc length of the trajectory segment $(\Delta l)$. In such cases, the route-relative integrator 418 may use a root finding algorithm, or other optimization algorithm, to solve for the following system of three equations:

$$\kappa = \frac{\eta_i + \eta_{i+1}}{2} + \frac{\sin^{-1}(l_r \eta_{i+1}) - \sin^{-1}(l_r \eta_i)}{\Delta l} \quad (16)$$

$$\begin{pmatrix} \sin(e_{\theta_{i+1}} + \overline{\theta}_i) \\ -\cos(e_{\theta_{i+1}} + \overline{\theta}_i) \end{pmatrix} = \begin{pmatrix} \sin(\theta, i) \\ -\cos(\theta, i)) \end{pmatrix} + \kappa * \left[ -\begin{pmatrix} 0 \\ e_{y,i} \end{pmatrix} + \overline{P}_i + e_{y,i+1} * \overline{r}_i \right] \quad (17)$$

$$\Delta l = \frac{\overline{\theta}_i + e_{\theta_{i+1}} - e_{\theta,i}}{\kappa} \quad (18)$$

Equation (17) represents, given that the vehicle is expected to move along an arc having a constant curvature $(\kappa)$, that the orientation of the vehicle at the next trajectory point can be determined based on the distance traveled by the vehicle during the trajectory segment and the curvature of the arc the vehicle travels over during the trajectory segment. In Equation (17), the term $(\overline{P}i)$ represents the next point on the reference path in a coordinate frame defined by the previous point on the reference path. Thus, Equation (17) relates the orientation of the vehicle at the next vehicle state to the current orientation of the vehicle, based on the geometry of a constant curvature arc that passes through the ray defined by the next point on the reference path.

In Equation (18), the term $(\overline{\theta}_i)$ represents the change in angle between two successive points on the reference path, and the terms $(e_{\theta_{i+1}})$ and $(e_{\theta,i})$ represent the relative angular offsets. In some examples, the system of equations (16)-(18) above may be reorganized, as shown below. In such examples, the route-relative integrator 418 may be configured to generate and solve for the reorganized system of equations below, in addition to or instead of the above system of equations.

$$y = [e_{y,i+1}, e_{\theta,i+1}, \Delta l]^T \quad (19)$$

-continued $$F(y) = 0 \tag{20}$$

$$\begin{pmatrix} f_1(y) \\ f_2(y) \end{pmatrix} = \begin{pmatrix} -\sin\left(e_{\theta_{i+1}} + \overline{\theta}_i\right) + \sin(\theta, i) \\ \cos\left(e_{\theta_{i+1}} + \overline{\theta}_i\right) - \cos(\theta, i) \end{pmatrix} + \tag{21}$$

$$\left( \frac{\eta_i + \eta_{i+1}}{2} + \frac{\sin^{-1}(l_r \eta_{i+1}) - \sin^{-1}(l_r \eta_i)}{\Delta l} \right) * \left[ -\begin{pmatrix} 0 \\ e_{y,i} \end{pmatrix} + \overline{P}_i + e_{y,i+1} * \overline{r}_i \right]$$

$$f_3(y) = -\Delta l + \frac{\overline{\theta}_i + e_{\theta_{i+1}} + e_{\theta,i}}{\kappa} \tag{22}$$

In this example, Equations (19)-(22) are a reorganization of Equations (16)-(18) above. In various examples, when using a root finding algorithm or other optimization algorithm to solve for the above system(s) of equations, the route-relative integrator 418 may improve efficiency and reduce computation time by determining a high-quality initial estimation for $\Delta l$. For instance, the route-relative integrator 418 may initially estimate a $\Delta l$ value based on the arc length $\Delta s$ of the reference segment, and/or a previously computed $\Delta l$ value from a previous trajectory segment (e.g., the previous adjacent trajectory segment in the same curve along which the vehicle is currently driving).

After estimating the arc length ($\Delta l$) the route-relative integrator 418 may use Newton's method to minimize the residual of $F(y)$ resulting from the approximation of the curvature used. In some cases, the route-relative integrator 418 may implement an adaptive technique by inspecting the resulting of $F(y_n)$, and performing a refinement/modification of the trajectory only when the errors of any of: $\sin(e_{\theta,i+1})$, $e_{y,i+1}$, and/or $\Delta l$ (each of which are easily computed) exceeds one or more thresholds.

Further, in some examples, the route-relative integrator 418 may use the following equations to solve for the inverse of $\Delta l$, (e.g., instead of solving for $\Delta l$) which may remove most of the divisions with respect to a free variable from the system.

$$y_{n+1} = y_n - J_f(y_n)^{-1} F(y_n) \tag{23}$$

$$y_{n+1} - y_n = -J_f(y_n)^{-1} F(y_n) \tag{24}$$

Equations (23) and (24) above provide an example of the canonical Newton's method for root finding. That is, for the systems of equations outline above in canonical form, Equations (23) and (24) allow the systems of equations to be solved for the zero point. The term (J) in this example refers to Jacobian, representing the derivative of the systems (f) with respect to the variable (y). In some examples, the techniques and/or equations used by the route-relative integrator 418 may be different when the curvature of the trajectory segment is at or near zero. In such cases, $J_f(y_n)$ might not be invertible and/or the route-relative integrator 418 may be unable to accurately solve the above system of equations (e.g., when $\kappa_n$ is near zero the $e_y$ column of $J_f$ also may be near zero). In some cases, when the curvature of the trajectory segment is near zero (e.g., with a threshold), the route-relative integrator 418 may replace $f_3(y)$ with a Euclidean distance formula for $\Delta l$, as shown in the example below:

$$f_3(y) = \Delta l + \left\| \overline{P}_i + e_{y_{i+1}} * \overline{r}_i \right\| \tag{25}$$

As noted above, in some examples executing a root finding algorithm may be an option to determine, substantially simultaneously, the lateral offset, orientation offset, and arc length of a trajectory segment by solving for the above system of equations representing these three variables. However, in other examples, the route-relative integrator 418 need not perform a root finding algorithm (or any other optimization algorithm), but instead may determine and rely on a high-quality initial estimation for the arc length $\Delta l$ of the trajectory segment, and may use the estimated $\Delta l$ to compute the curvature $\kappa$ of the segment. In such examples, because $$\frac{\Delta \beta}{\Delta l}$$

generally represents a small fraction of the curvature $\kappa$. (e.g., particularly if the autonomous vehicle 102 is configured to constrain curvature values), the divergence of the estimated $\Delta l$ may generally be small. Therefore, the computed value of curvature $\kappa$ might not be particularly sensitive to the error in the estimated $\Delta l$. Further, the route-relative integrator 418 may have access to a number of relatively accurate prior estimates of $\Delta l$, including the arc length of the corresponding reference segment ($\Delta s$), and/or the arc length step of the initial estimated trajectory (e.g., particularly when warm-starting is used). Using either of these for estimating $\Delta l$ may result in a constant, well-defined integrator, that may be mathematically similar to the result of the spatial route integrator. During optimization, the arc length of a previous trajectory segment also may provide an accurate estimation for the arc length of a subsequent segment. As the optimization converges, the arc lengths between trajectory adjacent trajectory segments may go to zero, meaning that kinematic divergence also may to zero. Therefore, the divergence might not be seen in the final output of the trajectory optimizer 410. In some examples, the following equations for approximation would be used for a trajectory segment i, during optimization iteration j. During the first optimization iteration, the segment arc length of the initial guess trajectory may be used.

$$\hat{\Delta l}_{i,j} = \Delta l_{i,j-1} \tag{26}$$

$$\hat{\kappa}_{i,j} = \overline{\eta} + \frac{\beta_{i+1} - \beta_i}{\Delta l_{i,j-1}} \tag{27}$$

In this example, the terms ($\hat{\Delta l}$) and ($\hat{\kappa}$) represent the estimated arc length (or distance traveled) and the estimated curvature, respectively. After determining (e.g., solving for) the vehicle state data (e.g., relative lateral offset, relative orientation offset), and the driving segment path data (e.g., segment arc length and/or curvature), the trajectory optimizer component 410 can perform a route-relative optimization based on a reference path to generate an optimized trajectory. In some instances, the trajectory optimizer component 410 can use a differential dynamic programming (DDP) algorithm (which also may be referred to as an iterative linear quadratic regulator (ILQR), such as a projected stage-wise Newton method, to evaluate a plurality of loss functions 420 to generate the optimized trajectory. Examples of loss functions 420 that may be used by the trajectory optimizer component 410 can include, but are not limited to, the loss functions described in U.S. application Ser. No. 16/147,492, titled "Trajectory Generation And Optimization Using Closed-Form Numerical Integration In Rout-Relative Coordinates," which is incorporated by reference herein.

In some examples, the systems of equations described above for determining curvature, distance traveled, and lateral offset of a trajectory segment of a predicted trajectory for a vehicle may be based on a kinematic bicycle model. The kinematic bicycle model is some instances might not account for any lateral motion of the vehicle caused by wet or icy roads, etc. However, in driving environments with wet roads, icy roads, slick surfaces, or other conditions that may cause lateral vehicle motion, the above equations may be modified based on the updated vehicle kinematics model.

In some instances, the trajectory smoother component 406 can include functionality to receive an instruction (e.g., from the trajectory generator component 404) and optimize the instruction based on objects identified in the environment. In at least one example, the trajectory smoother component 406 can access, receive, and/or determine real-time processed sensor data to determine object(s) in the environment where the autonomous vehicle 102 is travelling. In the at least one example, the trajectory smoother component 406 can process the instruction in view of the real-time processed sensor data.

In an example where the instruction is a trajectory, the trajectory smoother component 406 can leverage model(s) and/or algorithm(s), constraint(s), and/or cost(s) to optimize the trajectory. For instance, the trajectory smoother component 406 can utilize model(s) and/or algorithm(s) including, but not limited to, differential dynamic programming, interior point optimization, sequential quadratic programming, etc. to refine the trajectory. In at least one example, the constraint(s) can include, but are not limited to, geometry and/or physical properties of the vehicle and/or environment, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle can be optimized to include a positive, a negative, or a zero value. In at least one example, a rotation of the autonomous vehicle can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory smoother component 406 can generate an output trajectory.

In an example where the instruction is a policy, the trajectory smoother component 406 can leverage model(s) and/or algorithm(s), constraint(s), and/or cost(s) to generate a trajectory based on the policy and real-time processed sensor data. For instance, the trajectory smoother component 406 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory smoother component 406 can access, receive, and/or determine real-time processed sensor data. The trajectory smoother component 406 can leverage the real-time processed sensor data to generate an output trajectory. The trajectory smoother component 406 can utilize a more detailed model of the autonomous vehicle than the trajectory generator component 404. Processing that utilizes such a detailed model can be computationally expensive. Additionally, the trajectory smoother component 406 can output an output trajectory within a predetermined amount of time after receiving the real-time processed sensor data. For instance, in at least one example, the trajectory smoother component 406 can receive an interrupt requesting an output trajectory and the trajectory smoother component 406 can provide an output trajectory responsive to receiving the interrupt.

In some instances, the trajectory tracker component 408 can include functionality to receive an output trajectory from the trajectory smoother component 406 and can compute commands for actuating steering and acceleration of the autonomous vehicle 102 to enable the autonomous vehicle 102 to follow the output trajectory. In at least one example, the trajectory tracker component 408 can receive the output trajectory and can compute a steering angle and velocity to enable the autonomous vehicle 102 to follow the output trajectory. In some examples, the trajectory tracker component 408 can include a separate vehicle controller configured to control steering, propulsion, braking, safety, emitters, communication, and other systems of the vehicle.

Figure 5:
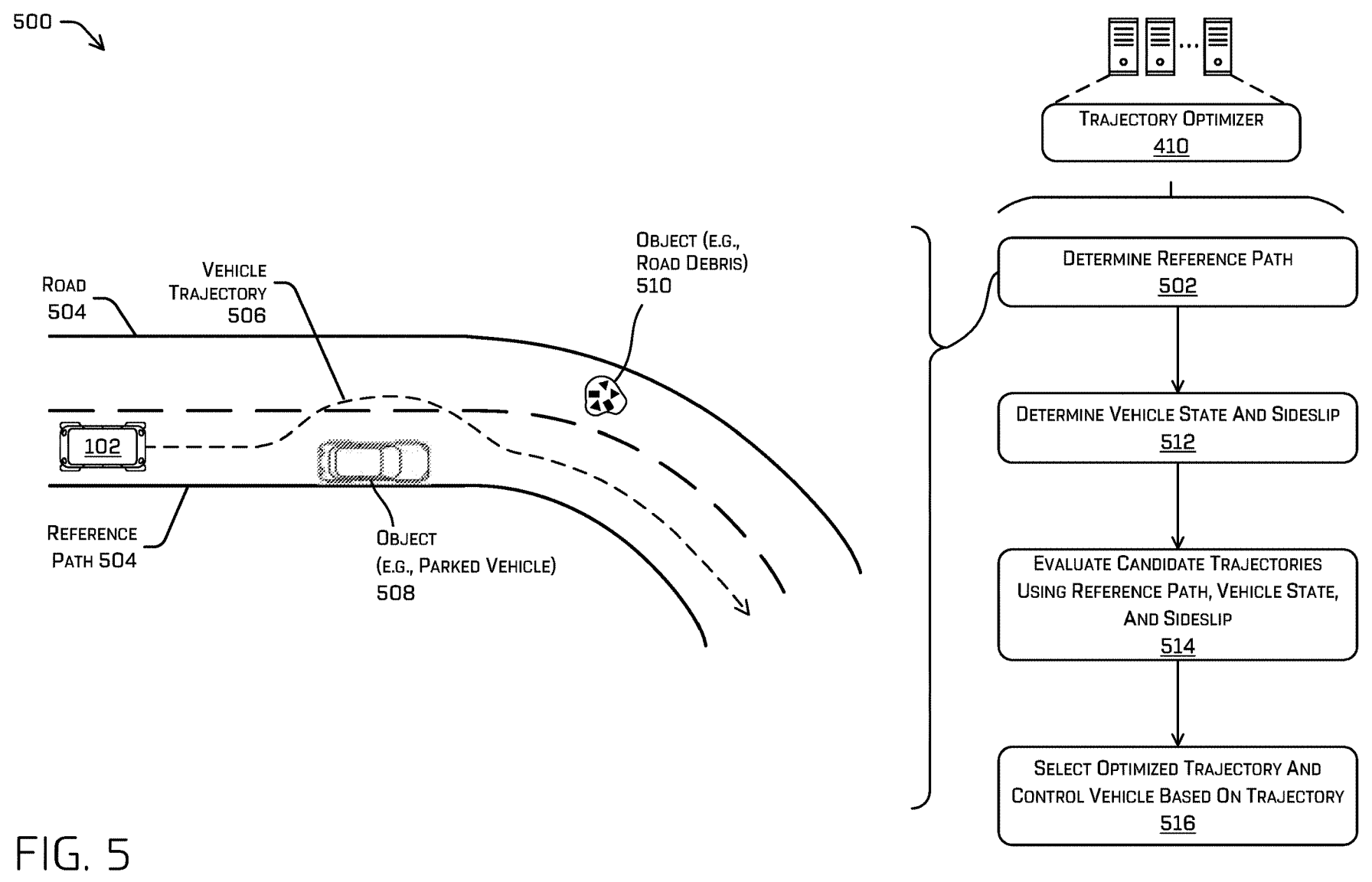

FIG. 5 illustrates a pictorial flow diagram 500 depicting an example process for determining a trajectory for a vehicle relative to a reference path, and controlling the vehicle based on the trajectory. As shown in this example, some or all of the operations of diagram 500 may be performed by a trajectory optimizer 410, in conjunction with the various other subcomponents of a planning component 112 as described herein.

At operation 502, the process can include determining or receiving a reference path for an autonomous vehicle 102 in a driving environment. As noted above, in some instances the planning component 112 may determine one or more reference trajectories based on a driving route determined for the vehicle based on its current state, intended destination, the map data, and/or other objects perceived in the environment, etc. In some instances, the operation 502 may include generating the reference path as an ideal route for the autonomous vehicle 102 to traverse through an environment, such as a center of a road segment. Reference trajectories can be generated based at least in part on static and/or dynamic obstacles in an environment, a minimum or maximum longitudinal acceleration or velocity, a maximum steering angle, vehicle dynamics (e.g., a notion that the wheels do not slip, etc.).

The example shown in diagram 500 depicts the vehicle 102 traversing a road 504 following a reference path 506 that has been determined for the vehicle 102. In this example, an object 508, such as a parked or disabled vehicle, is located in a lane of the road 504 where the vehicle 102 is currently driving. Another object 510, which may be road debris in this case, is located in the opposed lane from where the vehicle 102 is currently driving. In some instances, the operation 502 may include determining a reference path 506 may include one or more actions that the vehicle 102 can take to navigate around the objects 508 and 510 in the road 504. By way of example, and without limitation, the trajectory optimizer 410 can determine the reference path 506 based at least in part on the geometry of the road 504 and/or based on the objects 508 and 510 in the environment. In some examples, the reference path 506 can be based on static objects in the environment and may not reflect dynamic objects in the environment.

At operation 512, the trajectory optimizer 410 may determine vehicle state data, including the current vehicle position, orientation angle, and vehicle sideslip angle, for the autonomous vehicle 102 as it traverses the driving environment. As described above, the trajectory optimizer 410 may determine the current vehicle state data at each trajectory step in a sequence of trajectory steps, relative to the reference path. For instance, the vehicle state data determined in operation 512 may include a lateral offset (or error) representing the lateral distance between a state on the reference path and the current vehicle state, and/or an orientation offset (or error) representing angular difference between the heading of the reference path and the current vehicle heading. As noted above, the vehicle sideslip angle may refer to the angle between the orientation direction of the vehicle and the direction of the velocity of the vehicle.

At operation 514, the trajectory optimizer 410 may generate and evaluate one or more candidate trajectories for the vehicle 102 to follow from its current state to one or more subsequent states in the driving environment. As described herein, the candidate trajectories for the vehicle 102 may be generated and/or evaluated relative to the reference path, and the particular control trajectory for the vehicle may be determined using loss functions based at least in part on the difference between the control trajectory and the reference path. In some examples, operation 514 can include substantially simultaneously determining a number of possible vehicle accelerations and associated steering angles representing different candidate trajectories (or refinements/modifications of a single trajectory). The trajectory optimizer 410 may determine the subsequent vehicle state data and driving path data associated with each candidate trajectory, as described below in more detail in FIG. 6, and then may use an optimization algorithm to determine a trajectory (e.g., an optimized or lowest-cost trajectory as a control trajectory for controlling the vehicle 102.

At operation 516, the trajectory optimizer 410 may determine a trajectory for controlling the vehicle 102, based at least in part on the evaluation of the candidate trajectories in operation 514, and may control the vehicle 102 based on the determined control trajectory. In some examples, the trajectory optimizer 410 may evaluate one or more candidate trajectories to determine a vehicle trajectory using a single convergence of a differential dynamic programming (DDP) algorithm (e.g., a projected stage-wise Newton method). For instance, operation 516 may include evaluating a plurality of loss functions to determine a cost of each candidate trajectory (and/or trajectory refinement) with respect to a distance between the vehicle 102 and an object in the environment, a distance between the vehicle 102 and a corresponding state on the reference path 506, one or more target velocities, target steering angles, and/or based on any combination of the loss functions or trajectory evaluation criteria described herein (e.g., target trajectory curvature(s), target trajectory curvature rate(s), and/or passenger comfort metrics, safety metrics, route progress metrics, legality metrics, and the like). After determining a control trajectory to control the vehicle 102, based at least in part on one or more costs determined by the loss functions, the trajectory optimizer 410 may use the control trajectory to control the vehicle. For instance, the planning component 112 may provide control trajectory to one or more vehicle driving systems to implement the trajectory as a sequence of acceleration commands, braking commands, steering commands, etc., configured to control the movement and operation of the vehicle.

Figure 6:
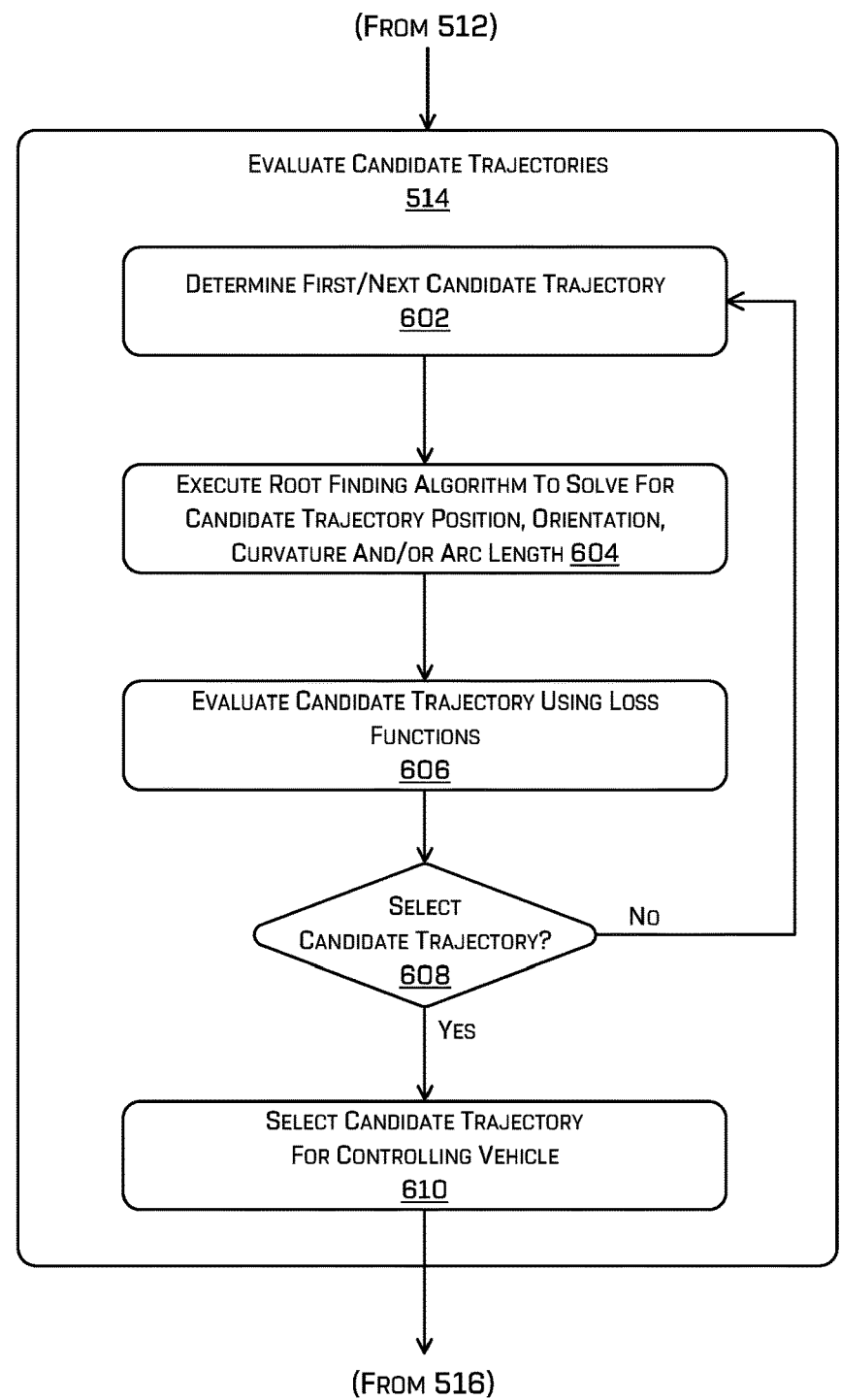
FIG. 6 illustrates an example process for determining subsequent vehicle state data and evaluating candidate trajectories based on the subsequent vehicle state data, in accordance with one or more examples of the disclosure.

FIG. 6 is a flow diagram illustrating an example process 600 of determining subsequent vehicle state data and evaluating candidate trajectories based on the subsequent vehicle state data, in accordance with one or more examples of the disclosure. As shown in this example, the process for the subsequent vehicle state data associated with a candidate trajectory (or a refinement/modification of a possible trajectory) may be included within operation 514, described above. Accordingly, the operations in process 600 also may be performed by a trajectory optimizer 410, in conjunction with the various other subcomponents of a planning component 112. As described below, process 600 may include performing a root finding algorithm or other optimization algorithm to determine the subsequent vehicle state data for candidate trajectory. These root finding algorithms (or other optimization algorithms) can be performed in a loop for any number of trajectory variations or refinements at each trajectory step, within the execution of a separate (outer) optimization algorithm corresponding to the optimization of the trajectory based on the loss functions.

At operation 602, the trajectory optimizer 410 may determine a next candidate trajectory to be evaluated by a loss function-based optimization algorithm. As described above, a candidate trajectory may include a number of vehicle states, each of which may include an acceleration and associated steering angle (or other vehicle control data) that can be used to control the vehicle at that vehicle state.

At operation 604, the trajectory optimizer 410 may execute a root finding algorithm to solve for the route-relative position, route-relative orientation, and the arc length of a trajectory segment of the candidate trajectory. The trajectory segment may correspond to the driving path between a current vehicle state and a subsequent vehicle state, which can be determined by an intersection point between the curved line corresponding to a driving path of the vehicle and a line extending from a reference point of the reference path. As described above, the trajectory optimizer 410 may use the route-relative integrator 418 to solve, substantially simultaneously, one or more systems of equations to determine the route-relative position, route-relative orientation, and the trajectory segment arc length. In some examples, the route-relative position may be the lateral offset ($e_{y,i+1}$) of the vehicle 102 at the next trajectory state, the orientation offset ($e_{\theta,i+1}$) of the vehicle 102 at the next trajectory state, and the arc length of the segment ($\Delta l$) representing the driving path to the next trajectory state. In some cases, the route-relative integrator 418 may use a single convergence of a differential dynamic programming (DDP) algorithm (e.g., a projected stage-wise Newton method) to determine the subsequent vehicle state data and driving path data in operation 604. As described above, operation 604 may be performed sequentially for any number of trajectory segments (e.g., 10 segments, 20 segments, 100 segments, etc.) in a candidate trajectory, to determine the lateral offset position, orientation, curvature, and arc length (or distance traveled) for each trajectory segment in the candidate trajectory.

At operation 606, the trajectory optimizer 410 may evaluate the candidate trajectory using one or more loss functions. As described above, the loss functions may include, but are not limited to, a loss function based on the distance between the vehicle 102 and an object in the environment (e.g., object 508 or object 510), a loss function based on the distance between the vehicle 102 and the corresponding point on the reference path 506, a loss function based on one or more target velocities of the vehicle, and/or a loss function based on one or more target steering angles. Additionally or alternatively, various other loss functions may be based on one or more of a target lateral acceleration(s), target longitudinal acceleration(s), target trajectory curvature(s), target trajectory curvature rate(s), and/or passenger comfort metrics, safety metrics, route progress metrics, legality metrics, and the like.

At operation 608, the trajectory optimizer 410 may determine whether a candidate trajectory may be identified or determined as a control trajectory for the vehicle 102. In some cases, the trajectory optimizer 410 may execute an optimization algorithm to determine a lowest cost (e.g., optimized) trajectory. Additionally or alternatively, the trajectory optimizer 410 may compare the output of the loss function(s) associated with a candidate trajectory to one or more cost thresholds. In some cases, the trajectory optimizer 410 may use a single convergence of a separate differential dynamic programming algorithm to determine a candidate trajectory in operation 608.

When the optimization algorithm used by the trajectory optimizer 410 has not yet converged on or other determined an optimized trajectory (608:No), then process 600 may return to operation 602 to determine and evaluate one or more additional candidate trajectories. However, when the optimization algorithm of the trajectory optimizer 410 has determined an optimized trajectory (608:Yes), then at operation 610 the candidate trajectory may be returned as the determined trajectory to be used for controlling the vehicle 102.

Figure 7:
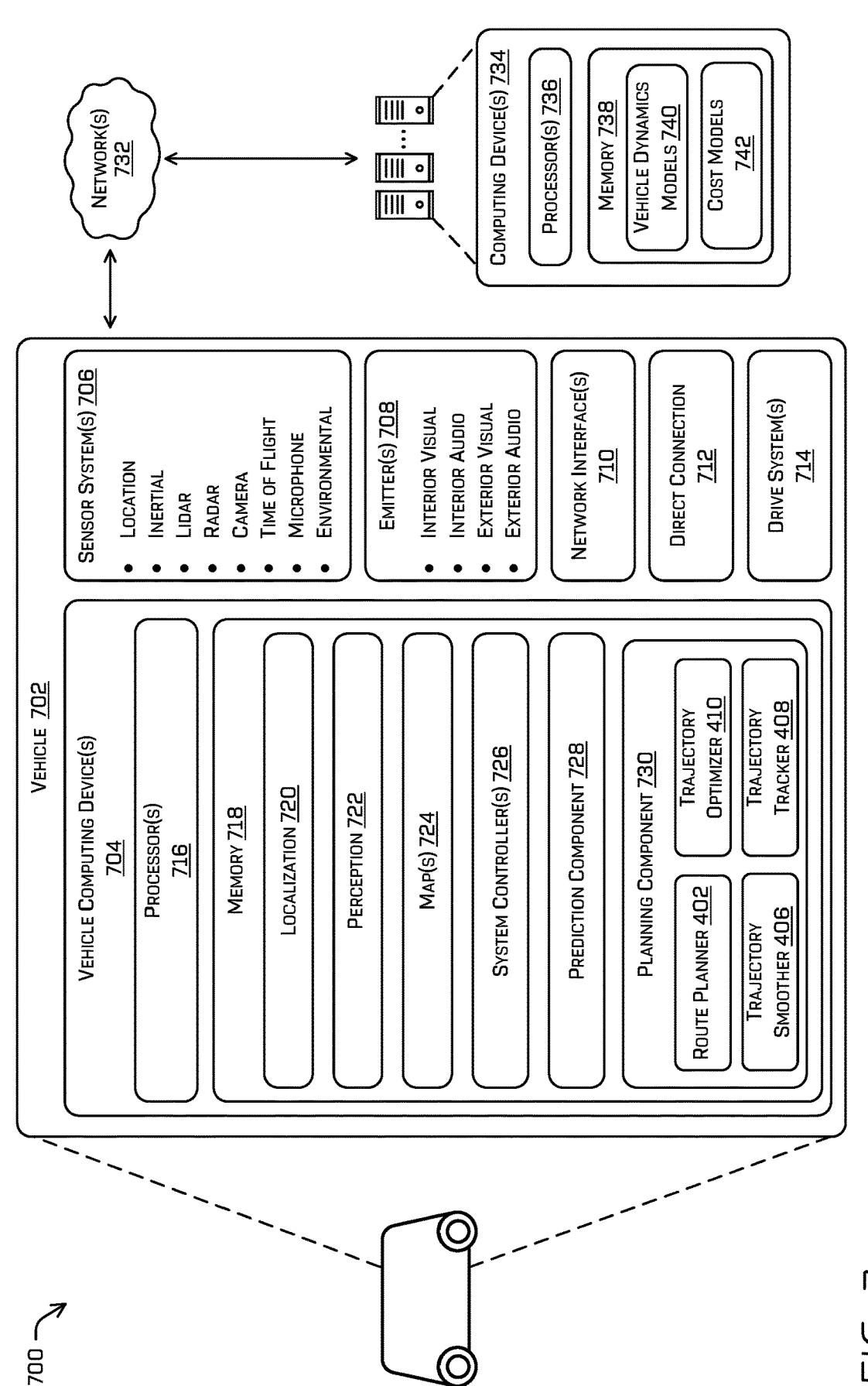
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more network interfaces 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having driving trajectory planning/navigation functionality. For example, the vehicle 702 may be similar or identical to the autonomous vehicle 102 discussed above in reference to FIGS. 1-6. In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, one or more maps 724 (or map data), one or more system controllers 726, a prediction component 728, and a planning component 730 including a route planner component 402, a trajectory smoother 406, a trajectory tracker 408, and a trajectory optimizer 410. Though depicted in FIG. 7 as residing in the memory 718 for illustrative purposes, it is contemplated that the localization component 720, the perception component 722, the maps 724, the system controllers 726, the prediction component 728, the planning component 730, the route planner component 402, the trajectory smoother 406, the trajectory tracker 408, and/or the trajectory optimizer 410 may additionally, or alternatively, be accessible to the vehicle 702

(e.g., stored on, or otherwise accessible by, memory remote from the vehicle 702, such as, for example, memory 738 of one or more computing device(s) 734). In some examples, the memory 738 may include one or more vehicle dynamics model(s) 740 (which may be associated with different vehicle types and models) and/or one or more cost models/functions 742.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 724, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 718 may further include one or more maps 724 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 724. That is, the map(s) 724 may be used in connection with the localization component 720, the perception component 722, the prediction component 728, and/or the planning component 730 to determine a location of the vehicle 702, detect objects in an environment, generate routes, determine actions and/or trajectories to navigate within an environment.

In some examples, the one or more maps 724 may be stored on a remote computing device(s) (such as the computing device(s) 734) accessible via network(s) 732. In some examples, multiple maps 724 may be stored based on, for example, a characteristic (e.g., type of entity, time of day, day of week, season of the year, etc.). Storing multiple maps 724 may have similar memory requirements, but increase the speed at which data in a map may be accessed.

In at least one example, the vehicle computing device 704 may include one or more system controllers 726, which may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

In some examples, the prediction component 728 may generate one or more probability maps representing prediction probabilities of possible locations of one or more objects in an environment. For example, the prediction component 728 may generate one or more probability maps for vehicles, pedestrians, animals, and the like within a threshold distance from the vehicle 702. In some instances, the prediction component 728 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment. In some examples, prediction component 728 may include one or more ML prediction models configured to generate predicted trajectories of objects in an environment. For example, the prediction component 728 may generate one or more predicted trajectories for objects within a threshold distance from the vehicle 702. In some examples, the prediction component 728 may measure a trace of an object and generate a trajectory for the object based on observed and predicted behavior.

The planning component 730 may include various components and functionalities similar or identical to those of the planning component 112, described above. As discussed above, the planning component 730 may determine a trajectory for the vehicle 702 to traverse through an environment by generating and/or optimizing the trajectory for the vehicle 702 relative to a reference path representing a desired route for the vehicle to traverse an environment, such as the center of a lane other efficient driving route taking into account the various objects in the environment. The planning component 730 may determine various routes and trajectories at various levels of detail. For example, the planning component 730 may determine trajectories to travel from a first location (e.g., corresponding to a first trajectory state) to a second location (e.g., a second or subsequent state of the trajectory). For the purpose of this discussion, a route may include a sequence of waypoints in a structured environment (e.g., including streets, intersections, etc.). The planning component 730 may generate instructions for guiding the vehicle 702 from a current state to a target state on the route designated for the vehicle. In at least one example, the planning component 730 may determine how to guide the vehicle 702 from a first state in a sequence of states to a second state in the sequence of states. In some examples, the instruction may be a candidate trajectory, or a portion of a trajectory. As described above, multiple trajectories may be substantially simultaneously generated (e.g., within technical tolerances) in accordance with a receding horizon technique. The trajectories may be evaluated (e.g., optimizing based on one or more loss functions) and single trajectory of the multiple trajectories in a receding data horizon having the lowest cost may be determined to control the vehicle. In various examples, the planning component 730 may determine a trajectory for the vehicle 702.

In various examples, the planning component 730 may alternatively, or additionally, use data from the localization component 720, the perception component 722, map(s) 724, and/or the prediction component 728 to determine a trajectory for the vehicle 702 to follow to traverse through an environment. For example, the planning component 730 may receive data (e.g., object data) from the localization component 720, the perception component 722, and/or the prediction component 728 regarding objects associated with an environment. In some examples, the planning component 730 receives data for relevant objects within the environment. Using this data, the planning component 730 may determine a driving maneuver to travel from a first location to a second location to avoid objects in an environment. In at least some examples, such a planning component 730 may determine there is no such collision-free trajectory and, in turn, provide a trajectory that brings the vehicle 702 safely to the target start while avoiding all collisions and/or otherwise mitigating damage.

In some instances, aspects of some or all of the components discussed herein may include any models, techniques, and/or machine learned techniques. For example, in some instances, the components in the memory 718 (and the memory 738, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 732, to the one or more computing device(s) 734 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more network interfaces 710 (or communication connections) that enable communication between the vehicle 702 and one or more other local or remote computing device(s). For instance, the network interfaces 710 may facilitate communication with other local computing device(s) on the vehicle 702 and/or the drive system(s) 714. Also, the network interface(s) 710 may allow the vehicle to communicate with other nearby computing device(s) (e.g., computing device(s) 734, other nearby vehicles, etc.) and/or one or more remote sensor system(s) for receiving sensor data. The network interface(s) 710 also may enable the vehicle 702 to communicate with a remote teleoperations computing device or other remote services.

The network interface(s) 710 may include physical and/or logical interfaces for connecting the vehicle computing device 704 to another computing device or a network, such as network(s) 732. For example, the network interface(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the maps 724, the system controllers 726, the prediction component 728, the planning component 730, the route planner component 402, the trajectory smoother 406, the trajectory tracker 408, and/or the trajectory optimizer 410 may process sensor data, as described above, and may send their respective outputs, over the one or more network(s) 732, to the computing device(s) 734. In at least one example, the localization component 720, the perception component 722, the maps 724, the system controllers 726, the prediction component 728, the planning component 730, the route planner component 402, the trajectory smoother 406, the trajectory tracker 408, and/or the trajectory optimizer 410 may send their respective outputs to the computing device(s) 734 at a particular frequency, after a lapse of a predetermined period of time, in near real-time, etc.

In some examples, the vehicle 702 may send sensor data to the computing device(s) 734 via the network(s) 732. In some examples, the vehicle 702 may receive sensor data from the computing device(s) 734 and/or remote sensor system(s) via the network(s) 732. The sensor data may include raw sensor data and/or processed sensor data and/or representations of sensor data. In some examples, the sensor data (raw or processed) may be sent and/or received as one or more log files.

The computing device(s) 734 may include processor(s) 736 and a memory 738, which may include one or more vehicle dynamics model(s) 740, and/or one or more cost models/functions 742. In some examples, computing device(s) 734 may store various vehicle dynamics model(s) 740 and/or cost models/functions 742, which may be associated with various different models of autonomous vehicles (e.g., having different capabilities and kino-dynamically feasible trajectories), different driving environments (e.g., regions, driving scene types, etc.), and/or different driving conditions (e.g., traffic conditions, road conditions, weather conditions, etc.). In such examples, the computing device(s) 734 may be configured to provide various combinations of mathematical functions and/or heuristics for generating inertial-based reference trajectories and/or route-based trajectories, as well as search exploration policies, and/or cost evaluator component(s) associated various different vehicles (e.g., 702), depending on the type, model, features, current driving environment, current driving conditions, etc., of the vehicles. Additionally, in some examples, the memory 738 may store one or more of components that are similar to the component(s) stored in the memory 718 of the vehicle 702. In such examples, the computing device(s) 734 may be configured to perform one or more of the processes described herein with respect to the vehicle 702.

The processor(s) 716 of the vehicle 702 and the processor(s) 736 of the computing device(s) 734 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 738 are examples of non-transitory computer-readable media. The memory 718 and memory 738 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 734 and/or components of the computing device(s) 734 may be associated with the vehicle 702. That is, the vehicle 702 may perform one or more of the functions associated with the computing device(s) 734, and vice versa.

EXAMPLE CLAUSES

A. A system comprising: one or more processors; and one or more non-transitory computer-readable media storing computer-executable instructions that, when executed, cause the system to perform operations comprising: determining a vehicle state associated with a vehicle in an environment, the vehicle state including a vehicle position and a vehicle orientation; receiving a reference path associated with the vehicle, the reference path including a first reference position associated with a first reference orientation; determining a sideslip angle of the vehicle, wherein the sideslip angle is associated with the vehicle state; determining a predicted vehicle state associated with the vehicle, based at least in part on the reference path, the vehicle state, and the sideslip angle, wherein determining the predicted vehicle state comprises executing an optimization algorithm to determine: a predicted vehicle position; a predicted vehicle orientation associated with the predicted vehicle position; and an arc length of a segment between the vehicle position and the predicted vehicle position; and controlling the vehicle to traverse the environment based at least in part on the predicted vehicle state.

B. The system of paragraph A, wherein determining the predicted vehicle state comprises: determining a plurality of candidate vehicle states for the vehicle; executing, for a candidate vehicle state in the plurality of candidate vehicle states, a root finding algorithm to determine, substantially simultaneously: a candidate vehicle position; a candidate vehicle orientation associated with the candidate vehicle position; and an arc length of a candidate segment between the vehicle position and the candidate vehicle position; and evaluating the plurality of candidate vehicle states, based at least in part on a loss function, to determine the candidate vehicle state as the predicted vehicle state.

C. The system of paragraph A, wherein determining the predicted vehicle state is based at least in part on a dynamics model that permits a non-zero sideslip.

D. The system of paragraph A, wherein determining the predicted vehicle state comprises: determining a curvature of the segment, based at least in part on the arc length of the segment and the sideslip angle of the vehicle.

E. The system of paragraph A, wherein executing the optimization algorithm comprises: determining an initial estimated curvature associated with the segment; and executing, based at least in part on the initial estimated curvature, a differential dynamic programming (DDP) algorithm to determine a single convergence.

F. A method comprising: determining, for a vehicle, a vehicle state including a vehicle position and a vehicle orientation; receiving a reference path for the vehicle to follow, the reference path including a first reference position associated with a first reference orientation; determining, based at least in part on the vehicle state, a sideslip angle; determining a vehicle trajectory based at least in part on the reference path, the vehicle state, and the sideslip angle, wherein determining the vehicle trajectory includes determining a predicted vehicle state including a predicted vehicle position and predicted vehicle orientation; and controlling the vehicle to traverse the environment based at least in part on the vehicle trajectory.

G. The method of paragraph F, wherein determining the second vehicle state comprises: determining a curvature of a segment between the vehicle position and the predicted vehicle position; and determining an arc length of the segment.

H. The method of paragraph G, wherein determining the predicted vehicle state further comprises: determining, based at least in part on a root finding algorithm, the curvature of the segment and the arc length of the segment.

I. The method of paragraph G, wherein determining the curvature of the segment comprises: determining an estimated arc length of the segment, based at least in part on at least one of: an arc length of a previous segment associated with the vehicle trajectory; or an arc length of a reference segment associated with the reference path; and determining the curvature of the segment, based at least in part on the estimated arc length and the first sideslip angle of the vehicle.

J. The method of paragraph F, wherein determining the second vehicle state comprises: executing an optimization algorithm to solve a system of equations substantially simultaneously, wherein solving the system of equations includes solving for: the second vehicle position; the second vehicle orientation; and an arc length of a segment between the first vehicle position and the second vehicle position.

K. The method of paragraph J, wherein executing the optimization algorithm comprises: determining an initial estimated curvature associated with the segment; and executing, based at least in part on the initial estimated curvature, a differential dynamic programming (DDP) algorithm to determine a single convergence.

L. The method of paragraph F, wherein determining the vehicle trajectory comprises: determining a plurality of candidate trajectories for the vehicle; optimizing a candidate trajectory of the plurality of candidate trajectories to determine: a position associated with the candidate trajectory, relative to the reference path; an orientation associated with the candidate trajectory, relative to the reference path; and an arc length associated with the candidate trajectory.

M. The method of paragraph F, wherein: determining the second vehicle position includes determining a lateral distance between the second vehicle state and a second reference position of the reference path; and determining the second vehicle orientation includes determining an orientation difference between the second vehicle state and a second reference orientation of the reference path.

N. The method of paragraph F, wherein determining the second vehicle state is based at least in part on a dynamics model that permits a non-zero sideslip.

O. One or more non-transitory computer-readable media storing processor-executable instructions that, when executed by one or more processors, cause the one or more processors to perform operations comprising: determining, for a vehicle, a vehicle state including a vehicle position and a vehicle orientation; receiving a reference path for the vehicle to follow; the reference path including a first reference position associated with a first reference orientation; determining, based at least in part on the vehicle state, a sideslip angle; determining a vehicle trajectory based at least in part on the reference path, the vehicle state, and the sideslip angle, wherein determining the vehicle trajectory includes determining a predicted vehicle state including a predicted vehicle position and predicted vehicle orientation; and controlling the vehicle to traverse the environment based at least in part on the vehicle trajectory.

P. The one or more non-transitory computer-readable media of paragraph O, wherein determining the second vehicle state comprises: determining a curvature of a segment between the vehicle position and the predicted vehicle position; and determining an arc length of the segment.

Q. The one or more non-transitory computer-readable media of paragraph P, wherein determining the predicted vehicle state further comprises: determining, based at least in part on a root finding algorithm, the curvature of the segment and the arc length of the segment.

R. The one or more non-transitory computer-readable media of paragraph O, wherein determining the second vehicle state comprises: executing an optimization algorithm to solve a system of equations substantially simultaneously, wherein solving the system of equations includes solving for: the second vehicle position; the second vehicle orientation; and an arc length of a segment between the first vehicle position and the second vehicle position.

S. The one or more non-transitory computer-readable media of paragraph R, wherein executing the optimization algorithm comprises: determining an initial estimated curvature associated with the segment; and executing, based at least in part on the initial estimated curvature, a differential dynamic programming (DDP) algorithm to determine a single convergence.

T. The one or more non-transitory computer-readable media of paragraph O, wherein determining the vehicle trajectory comprises: determining a plurality of candidate trajectories for the vehicle; optimizing a candidate trajectory of the plurality of candidate trajectories to determine: a position associated with the candidate trajectory, relative to the reference path; an orientation associated with the candidate trajectory, relative to the reference path; and an arc length associated with the candidate trajectory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

determining a current vehicle state associated with a vehicle, on a current driving path of the vehicle in an environment, the current vehicle state including a vehicle position and a vehicle orientation;

receiving a reference path associated with the vehicle, wherein the reference path is different from the current driving path, the reference path including a reference point offset from the current driving path;

determining a sideslip angle of the vehicle, wherein the sideslip angle is associated with the current vehicle state;

determining a candidate vehicle state associated with the vehicle, based at least in part on the current vehicle state, the reference point on the reference path, and the sideslip angle of the vehicle, wherein determining the candidate vehicle state comprises executing a root finding algorithm to determine, substantially simultaneously:

a candidate vehicle position associated with the candidate vehicle state;

a candidate vehicle orientation associated with the candidate vehicle position; and a candidate arc length of a segment between the vehicle position and the candidate vehicle position;

determining, using a loss function, a loss value associated with the candidate vehicle state, based at least in part on the candidate vehicle position, the candidate vehicle orientation, and the candidate arc length; and determining, based at least in part on the loss value, a candidate trajectory including the candidate vehicle state as a control trajectory for controlling the vehicle to traverse the environment.

2. The system of claim 1, wherein determining the candidate vehicle state is based at least in part on a dynamics model that permits a non-zero sideslip.

3. A method comprising:

determining, for a vehicle, a current vehicle state on a current driving path of the vehicle, the current vehicle state including a vehicle position and a vehicle orientation;

receiving a reference path for the vehicle to follow, wherein the reference path is different from the current driving path, the reference path including a reference point offset from the current driving path;

determining, based at least in part on the current vehicle state, a sideslip angle of the vehicle;

determining a candidate trajectory based at least in part on the current vehicle state, the reference point on the reference path, and the sideslip angle of the vehicle, wherein determining the candidate trajectory includes:

determining a predicted vehicle state of the candidate trajectory, including a predicted vehicle position and predicted vehicle orientation of the predicted vehicle state; and determining, based at least in part on a root finding algorithm, a curvature of a segment between the vehicle position and the predicted vehicle position, and an arc length of the segment; and controlling the vehicle based at least in part on the candidate trajectory.

4. The method of claim 3, wherein determining the curvature of the segment comprises:

determining an estimated arc length of the segment, based at least in part on at least one of:

an arc length of a previous segment associated with the current driving path; or an arc length of a reference segment associated with the reference path; and determining the curvature of the segment, based at least in part on the estimated arc length and the sideslip angle of the vehicle.

5. The method of claim 3, wherein determining the predicted vehicle state comprises:

executing an optimization algorithm to solve a system of equations substantially simultaneously, wherein solving the system of equations includes solving for:

the predicted vehicle position;

the predicted vehicle orientation; and the arc length of the segment between the vehicle position and the predicted vehicle position.

6. The method of claim 5, wherein executing the optimization algorithm comprises:

determining an initial estimated curvature associated with the segment; and executing, based at least in part on the initial estimated curvature, a differential dynamic programming (DDP) algorithm to determine a single convergence.

7. The method of claim 3, wherein determining the candidate trajectory comprises:

determining a plurality of candidate trajectories for the vehicle;

optimizing a candidate trajectory of the plurality of candidate trajectories to determine:

a position associated with the candidate trajectory, relative to the reference path;

an orientation associated with the candidate trajectory, relative to the reference path; and an arc length associated with the candidate trajectory.

8. The method of claim 3, wherein:

determining the predicted vehicle position includes determining a lateral distance between the predicted vehicle state and a second reference point on the reference path; and determining the predicted vehicle orientation includes determining an orientation difference between the predicted vehicle state and a second reference orientation associated with the second reference point.

9. The method of claim 3, wherein determining the predicted vehicle state is based at least in part on a dynamics model that permits a non-zero sideslip.

10. One or more non-transitory computer-readable media storing processor-executable instructions that, when executed by one or more processors, cause the one or more processors to perform operations comprising:

determining, for a vehicle, a current vehicle state on a current driving path of the vehicle, the current vehicle state including a vehicle position and a vehicle orientation;

receiving a reference path for the vehicle to follow, wherein the reference path is different from the current driving path, the reference path including a reference point offset from the current driving path;

determining, based at least in part on the current vehicle state, a sideslip angle of the vehicle;

determining a candidate trajectory based at least in part on the current vehicle state, the reference point on the reference path, and the sideslip angle of the vehicle, wherein determining the candidate trajectory includes:

determining a predicted vehicle state of the candidate trajectory, including a predicted vehicle position and predicted vehicle orientation of the predicted vehicle state; and determining, based at least in part on a root finding algorithm, a curvature of a segment between the vehicle position and the predicted vehicle position, and an arc length of the segment; and controlling the vehicle based at least in part on the candidate trajectory.

11. The one or more non-transitory computer-readable media of claim 10, wherein determining the predicted vehicle state comprises:

executing an optimization algorithm to solve a system of equations substantially simultaneously, wherein solving the system of equations includes solving for:

the predicted vehicle position;

the predicted vehicle orientation; and the arc length of the segment between the vehicle position and the predicted vehicle position.

12. The one or more non-transitory computer-readable media of claim 11, wherein executing the optimization algorithm comprises:

determining an initial estimated curvature associated with the segment; and executing, based at least in part on the initial estimated curvature, a differential dynamic programming (DDP) algorithm to determine a single convergence.

13. The method of claim 3, wherein determining the candidate trajectory is based at least in part on:

a lateral offset between the current vehicle state and the reference point on the reference path; and an angular offset between the current vehicle state and the reference point.

14. The method of claim 3, wherein determining the candidate trajectory further comprises:

determining a second reference point on the reference path, based at least in part on an intersection between the predicted vehicle position and a reference vector perpendicular to the reference path at the second reference point;

determining a lateral offset between the predicted vehicle state and the second reference point; and determining an angular offset between the predicted vehicle state and the second reference point.

15. The method of claim 3, wherein receiving the reference path comprises:

determining a roadway associated with the current vehicle state; and receiving from a map server, the reference path associated with the roadway.

16. The method of claim 3, wherein determining the candidate trajectory comprises:

determining the root finding algorithm as an optimization algorithm to be executed, based at least in part on determining that the sideslip angle of the vehicle is a non-zero sideslip angle.

17. The method of claim 3, wherein determining the candidate trajectory further comprises:

determining a plurality of candidate driving paths for the vehicle;

determining a candidate vehicle state associated with each of the plurality of candidate driving paths;

determining, for each candidate vehicle state:

a candidate vehicle position;

a candidate vehicle orientation; and a candidate arc length; and evaluating each candidate driving path of the plurality of candidate driving paths, based at least in part on the candidate vehicle position, the candidate vehicle orientation, and the candidate arc length of the candidate vehicle state associated with the candidate driving path.

18. The one or more non-transitory computer-readable media of claim 10, wherein determining the candidate trajectory comprises:

determining the root finding algorithm as an optimization algorithm to be executed, based at least in part on determining that the sideslip angle of the vehicle is a non-zero sideslip angle.

19. The one or more non-transitory computer-readable media of claim 10, wherein determining the candidate trajectory further comprises:

determining a plurality of candidate driving paths for the vehicle;

determining a candidate vehicle state associated with each of the plurality of candidate driving paths;

determining, for each candidate vehicle state:

a candidate vehicle position;

a candidate vehicle orientation; and a candidate arc length; and evaluating each candidate driving path of the plurality of candidate driving paths, based at least in part on the candidate vehicle position, the candidate vehicle orientation, and the candidate arc length of the candidate vehicle state associated with the candidate driving path.

\* \* \* \* \*